United States Patent
Hashimoto et al.

(10) Patent No.: US 9,878,385 B2
(45) Date of Patent: Jan. 30, 2018

(54) WIRE ELECTRIC DISCHARGE MACHINING APPARATUS, WIRE ELECTRIC DISCHARGE MACHINING METHOD, AND CONTROL DEVICE

(71) Applicant: Mitsubishi Electric Corporation, Tokyo (JP)

(72) Inventors: Takashi Hashimoto, Tokyo (JP); Takashi Yuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/033,677

(22) PCT Filed: Dec. 19, 2013

(86) PCT No.: PCT/JP2013/084133
§ 371 (c)(1),
(2) Date: May 2, 2016

(87) PCT Pub. No.: WO2015/092903
PCT Pub. Date: Jun. 25, 2015

(65) Prior Publication Data
US 2016/0256944 A1   Sep. 8, 2016

(51) Int. Cl.
*B23H 7/00* (2006.01)
*B23H 1/02* (2006.01)
(Continued)

(52) U.S. Cl.
CPC .............. *B23H 1/02* (2013.01); *B23H 1/026* (2013.01); *B23H 7/02* (2013.01); *B23H 7/20* (2013.01); *G05B 2219/45043* (2013.01)

(58) Field of Classification Search
CPC . B23H 1/02; B23H 1/026; B23H 7/02; B23H 7/20; G05B 2219/45043
(Continued)

(56) References Cited

U.S. PATENT DOCUMENTS

| | | | | |
|---|---|---|---|---|
| 4,544,819 A | * | 10/1985 | Nomura | B23H 7/06 219/69.12 |
| 5,242,555 A | * | 9/1993 | Buhler | B23H 7/06 204/297.06 |
| 5,556,554 A | | 9/1996 | Morishita | |

FOREIGN PATENT DOCUMENTS

| | | |
|---|---|---|
| JP | 57-71727 A | 5/1982 |
| JP | 58-28429 A | 2/1983 |

(Continued)

OTHER PUBLICATIONS

International Search Report of PCT/JP2013/084133, dated Mar. 11, 2014. [PCT/ISA/210].
(Continued)

*Primary Examiner* — Thien S Tran
(74) *Attorney, Agent, or Firm* — Sughrue Mion, PLLC; Richard C. Turner

(57) ABSTRACT

A wire electric discharge machining apparatus includes a machining unit that forms a product part by cutting off an outer frame portion from a workpiece and a control device that controls the machining unit. The machining unit machines a first boundary region in a boundary between a member to be the outer frame portion and a member to be the product part to leave an uncut portion, cuts off the product part from the outer frame portion by machining a second boundary region, which is the uncut portion, and repeats machining for the first/second boundary regions. The uncut portion has a side crossing a machining direction in machining the second boundary region, and when machining the second boundary region, the control device controls the machining unit to start the machining from the crossing side.

7 Claims, 15 Drawing Sheets

(51) Int. Cl.
*B23H 7/02* (2006.01)
*B23H 7/20* (2006.01)

(58) Field of Classification Search
USPC .......................................... 219/69.12, 69.17
See application file for complete search history.

(56) References Cited

FOREIGN PATENT DOCUMENTS

| | | | |
|---|---|---|---|
| JP | 60-201824 | A | 10/1985 |
| JP | 61-61711 | A | 3/1986 |
| JP | 62-44317 | A | 2/1987 |
| JP | 63-120029 | A | 5/1988 |
| JP | 3-36721 | U | 4/1991 |
| JP | 3-92218 | A | 4/1991 |
| JP | 4-25320 | A | 1/1992 |
| JP | 5-42415 | A | 2/1993 |
| JP | 8-19918 | A | 1/1996 |
| JP | 2006-21281 | A | 1/2006 |
| WO | 2015/092902 | A2 | 6/2015 |

OTHER PUBLICATIONS

Written Opinion of PCT/JP2013/084133, dated Mar. 11, 2014. [PCT/ISA/237].

\* cited by examiner

VOLTAGE AND CURRENT WAVEFORMS OF
C-SHAPE MACHINING

VOLTAGE AND CURRENT WAVEFORMS OF
UNCUT PORTION
(AFTER CORRECTION)

C-SHAPE MACHINING

RESIDUAL PART MACHINING

SHIFT OF CORE IS ABSENT

SHIFT OF CORE IS PRESENT

WIRE ELECTRIC DISCHARGE MACHINING APPARATUS, WIRE ELECTRIC DISCHARGE MACHINING METHOD, AND CONTROL DEVICE

CROSS REFERENCE TO RELATED APPLICATIONS

This application is a National Stage of International Application No. PCT/JP2013/084133 filed Dec. 19, 2013, the contents of all of which are incorporated herein by reference in their entirety.

FIELD

The present invention relates to a wire electric discharge machining apparatus, a wire electric discharge machining method, and a control device that cut off a desired part from a workpiece through wire electric discharge machining.

BACKGROUND

As one of wire electric discharge machining methods, there is a method of machining a workpiece (a work), which is a conductive material, along a machining route from a machining start point to a machining end point to separate the workpiece into a part on a side to be left and a part on a side to be cut off (a product part). In this method, an uncut portion is provided to prevent the product part from being cut off in first machining. Thereafter, in second machining, after the original portion of the workpiece and the product part are bridged by a conductive member (a bridging member), the uncut portion is machined.

For example, in a wire electric discharge machining method described in Patent Literature 1, after portions other than an uncut portion are machined, a melting coagulation fixing material is poured into a machining groove in a melted state. The uncut portion, which is an un-machined portion, is machined to separate a workpiece into at least two parts.

In a wire electric discharge machining method described in Patent Literature 2, a bridging member is provided over a product part (a core) and a workpiece. After the core is held by the bridging member, machining of an uncut portion is performed. At this point, finishing is performed after leaving the uncut portion. Thereafter, the bridging member is bridged to a machined portion by a bridging apparatus. The uncut portion, which is an un-machined portion, is machined. At this point, machining up to finishing is performed on the un-machined portion.

CITATION LIST

Patent Literature

Patent Literature 1: Japanese Patent Application Laid-Open No. 2006-21281
Patent Literature 2: Japanese Patent Application Laid-Open No. H8-019918

SUMMARY

Technical Problem

However, in the former and latter conventional technologies, a specific machining method for the product part (the core) is not disclosed. A conductive material is used for the bridging member. Therefore, electric conductivity between the core and the workpiece is secured. However, the bridging member has high resistance compared with the workpiece. Therefore, even in the case of machining under the same conditions, machining energy is different in machining before the cut-off of the core and machining through the conductive member after the cut-off. Therefore, streaks of machining traces occur in the core and machining quality is deteriorated.

The present invention has been devised in view of the above and it is an object of the present invention to obtain a wire electric discharge machining apparatus, a wire electric discharge machining method, and a control device that can form a core of a desired shape from a workpiece.

Solution to Problem

In order to solve the above problem, and in order to attain the above object, a wire electric discharge machining apparatus of the present invention includes: a power supply device that applies a voltage between a wire and a workpiece; a machining unit that machines the workpiece by relatively moving the wire and the workpiece and forms a product part, which is an inner side portion of the workpiece and a target machining shape, by cutting off an outer frame portion from the workpiece; and a control device that controls the power supply device and the machining unit. The machining unit machines a first boundary region in a boundary between a member to be the outer frame portion and a member to be the product part to leave a part of the boundary as an uncut portion, thereafter, after the member to be the product part and the member to be the outer frame portion are connected by a conductive member, cuts off the product part from the outer frame portion by machining a second boundary region, which is the uncut portion, in the boundary, and, when machining the workpiece, repeats a plurality of times of machining for the first boundary region and repeats a plurality of times of machining for the second boundary region. The uncut portion has a side crossing a machining direction in machining the second boundary region. When machining the second boundary region, the control device controls the machining unit to start the machining from the crossing side.

Advantageous Effects of Invention

According to the present invention, there is an effect that it is possible to from a core of a desired shape from a workpiece.

DESCRIPTION OF EMBODIMENTS

A wire electric discharge machining apparatus, a wire electric discharge machining method, and a control device according to an embodiment of the present invention are explained in detail below with reference to the drawings. Note that the present invention is not limited by the embodiment.

Embodiment

Figure 1:
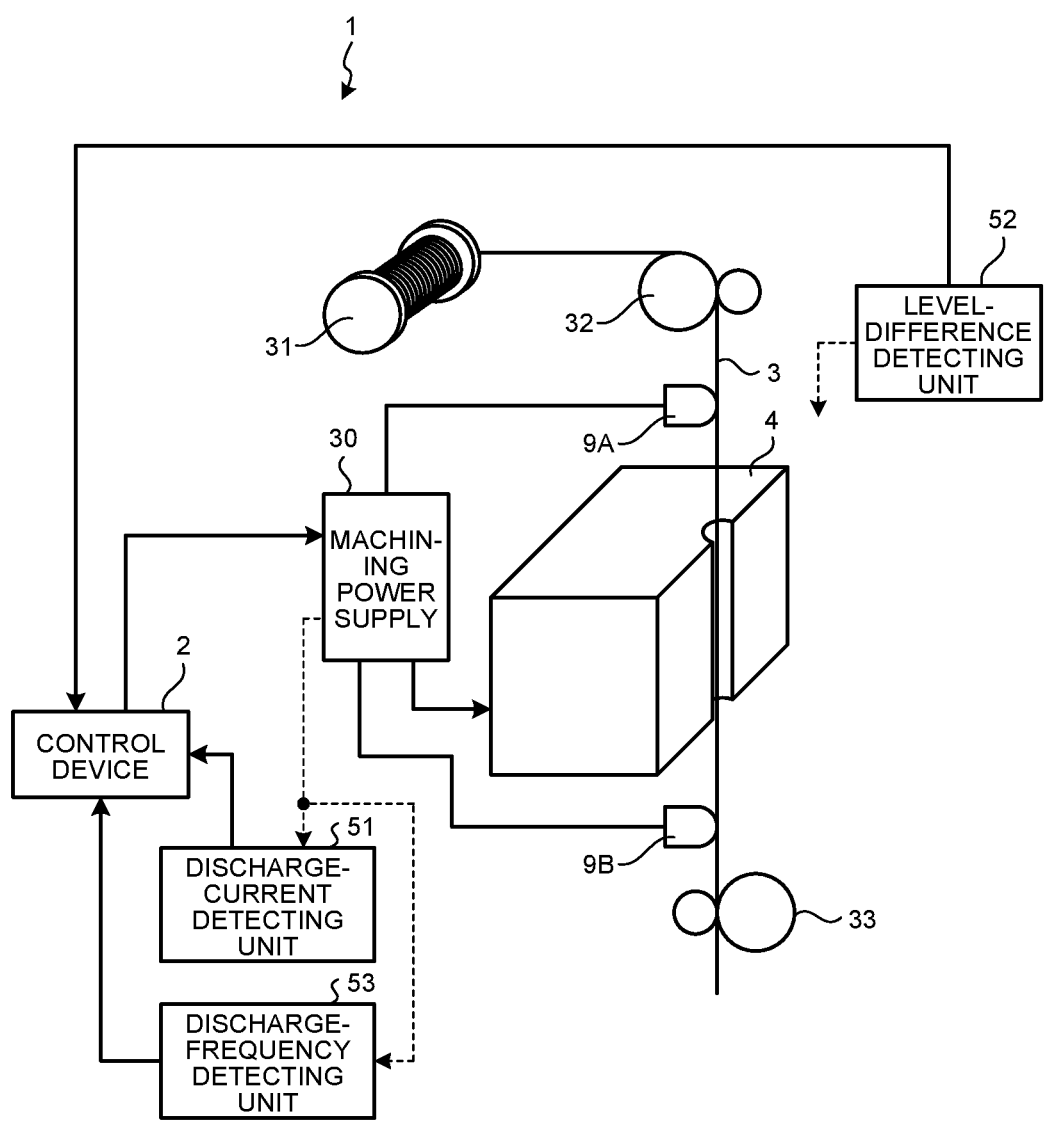
FIG. 1 is a diagram showing the configuration of a wire electric discharge machining apparatus according to an embodiment.
Figure 2:
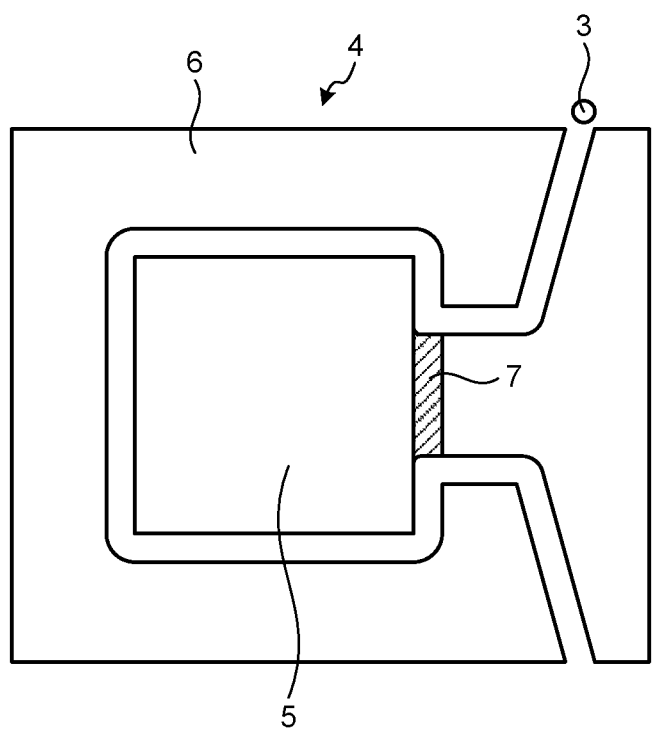
FIG. 2 is a top view of a workpiece.

FIG. 1 is a diagram showing the configuration of a wire electric discharge machining apparatus according to an embodiment. FIG. 2 is a top view of a workpiece. A wire electric discharge machining apparatus 1 is an apparatus that cuts off a desired part (a product part, which is a target machining shape) (a core 5) from a workpiece 4 through wire electric discharge machining. The wire electric discharge machining apparatus 1 cuts off a predetermined contour shape from the workpiece 4 and form a product part by relatively moving the workpiece 4 and a wire 3.

The wire electric discharge machining apparatus 1 machines the workpiece (a work) 4, which is a conductive adhesive material, along a machining route (a machining track) from a machining start point to a machining end point to separate the workpiece 4 into a part on a side to be left and a part on a side to be cut off (a product part). At this point, in the wire electric discharge machining apparatus 1, to prevent a member to be the product part from being cut off in first machining, an uncut portion 7 is provided between the part on the side to be left (a member to be an outer frame portion) and the member to be the product part on the side to be cut off. In other words, if the shape of the product part is a square shape, the wire electric discharge machining apparatus 1 forms a C-shape machining groove in the workpiece 4 when the workpiece 4 is viewed from the upper surface side.

Thereafter, in second machining, the wire electric discharge machining apparatus 1 bridges, with a conductive adhesive member (bridging sections 21A to 21D explained below), a machining groove between the workpiece 4 and the product part and machines the uncut portion 7 in this state. Consequently, an inner side portion (the core 5) of the workpiece 4 changes to a product part.

In this embodiment, the product part cut off from the workpiece 4 is referred to as core 5. In the workpiece 4, the part on the side to be left by the cut-off of the core 5 is referred to as outer frame portion 6. The first machining (machining of the portions other than the uncut portion 7) is referred to as C-shape machining (machining on a first boundary region). The second machining (machining of the uncut portion 7) is referred to as residual part machining (machining on a second boundary region).

The wire electric discharge machining apparatus 1 includes the wire (a wire electrode) 3, a wire bobbin 31, a delivering roller 32, a winding roller 33, and power feeding terminals 9A and 9B. The wire bobbin 31 delivers the wire 3 to the delivering roller 32.

The delivering roller 32 controls the tension of the wire 3 by delivering the wire 3, which is delivered from the wire bobbin 31, to the workpiece 4 side. The delivering roller 32 is set between the wire bobbin 31 and the workpiece 4. The delivering roller 32 mainly applies tension in an opposite direction of a traveling direction of the wire 3.

The winding roller 33 is set on a side for collecting the wire 3. The winding roller 33 winds, at substantially fixed collection speed, the wire 3 delivered from the wire bobbin 31 via the delivering roller 32. With this configuration, the wire 3 is stretched and suspended between the delivering roller 32 and the winding roller 33. Machining on the workpiece 4 is performed by the stretched and suspended wire 3.

The wire electric discharge machining apparatus 1 includes a control device 2, a machining power supply 30, a discharge-current detecting unit 51, a level-difference detecting unit 52, and a discharge-frequency detecting unit 53. The machining power supply 30 is connected to the control device 2, the workpiece 4, and the power feeding terminals 9A and 9B. The control device 2 is connected to the machining power supply 30, the discharge-current detecting unit 51, the level-difference detecting unit 52, and the discharge-frequency detecting unit 53.

The machining power supply 30 is a power supply device that applies a voltage between the wire 3 and the workpiece 4 by feeding an electric current to the power feeding terminals 9A and 9B according to an instruction from the control device 2. The discharge-current detecting unit 51 detects a discharge current (a machining pulse) after machining (finishing) 2nd next to 1st machining (rough machining) and sends a detection result to the control device 2.

The level-difference detecting unit 52 detects a level difference between a machined portion by the C-shape machining and a machined portion by the residual part machining after a finishing program for the uncut portion 7 (the entire core 5) ends. The level-difference detecting unit 52 detects the level difference using an optical method (laser sensing and image processing of a picked-up image) or the like. The level-difference detecting unit 52 sends the detected level difference (a detection result) to the control device 2. The discharge-frequency detecting unit 53 detects a machining pulse (a change in a discharge frequency) of the finishing and sends a detection result to the control device 2. Alternatively, the level-difference detecting unit 52 is not limited to the optical method and can determine the level difference from discrimination of a machining state. For example, the level-difference detecting unit 52 can detect a change in a discharge frequency in an approach run section explained below and determine the change as a level difference.

The wire electric discharge machining apparatus 1 in this embodiment executes at least one of characteristics (1) to (6) explained below.

(1) In the finishing during the residual part machining, the wire electric discharge machining apparatus 1 feeds electric power from the power feeding terminal 9B, which is disposed in a position on a side away from the bridging sections 21A to 21D, to the wire 3.

(2) The wire electric discharge machining apparatus 1 corrects electric conditions for the residual part machining on the basis of the impedance of the bridging sections 21A to 21D such that the C-shape machining and the residual part machining are performed under the same current condition.

(3) After the finishing program for the uncut portion 7 ends, when detecting a level difference (unevenness viewed from the upper surface) between a C-shape machined portion and a residual part machined portion, the wire electric discharge machining apparatus 1 increases, from an initial condition, a quiescent pulse width (a quiescent time) stepwise while fixing a pulse width and performs additional machining until the level difference is eliminated.

(4) In the C-shape machining, the wire electric discharge machining apparatus 1 forms the approach run section used during the finishing of the uncut portion 7 by finishing the vicinity of the uncut portion 7 to be larger than a desired dimension of the uncut portion 7 in advance. The wire electric discharge machining apparatus 1 starts the finishing from the approach run section when performing the finishing after the rough machining of the uncut portion 7.

(5) The wire electric discharge machining apparatus 1 sets, as a finishing condition for the approach run section, a finishing condition in which a pulse width is the same as and a quiescent pulse width is different from an initial condition when compared with a finishing condition for the uncut portion 7.

(6) When performing the C-shape machining, the wire electric discharge machining apparatus 1 provides a slope in a machining route of the approach run section with respect to a finish surface of the core 5. The wire electric discharge machining apparatus 1 calculates a tilt degree (a shift viewed from the upper surface) with respect to the outer frame portion 6 of the core 5 on the basis of a change in a discharge frequency of the finishing (machining pulse timing) in the approach run section in the residual part machining and performs the finishing after correcting, according to the tilt degree, a machining route in performing the machining of the uncut portion 7. Note that the tilt degree is not limited to be calculated on the basis of the change in the discharge frequency and can be directly measured from the optical method in the level-difference detecting unit 52.

The control device 2 controls the wire electric discharge machining apparatus 1 using detection results sent from the discharge-current detecting unit 51, the level-difference detecting unit 52, and the discharge-frequency detecting unit 53. The control device 2 executes (2), (3), or (5) explained above by controlling the machining power supply 30. The control device 2 executes (4) or (6) explained above by controlling the position of the wire 3 or the workpiece 4 (controls a track of the wire 3).

Note that the wire electric discharge machining apparatus 1 controls a machining route by controlling relative positions of the workpiece 4 and the wire 3. Therefore, the wire electric discharge machining apparatus 1 can controls the machining route by controlling the position of the wire 3 or can control the machining route by controlling the position of the workpiece 4.

When controlling the position of the wire 3, the control device 2 controls the position of a machining unit including the wire bobbin 31, the delivering roller 32, the winding roller 33, and the power feeding terminals 9A and 9B. When controlling the position of the workpiece 4, the control device 2 controls the position of a surface plate (corresponding to supporting sections 11 and 12 and supporting plates 13A, 13B, 14A, and 14B explained below) on which the workpiece 4 is placed. In the following explanation, the wire electric discharge machining apparatus 1 controls the machining route by controlling the position of the wire 3.

Figure 3:
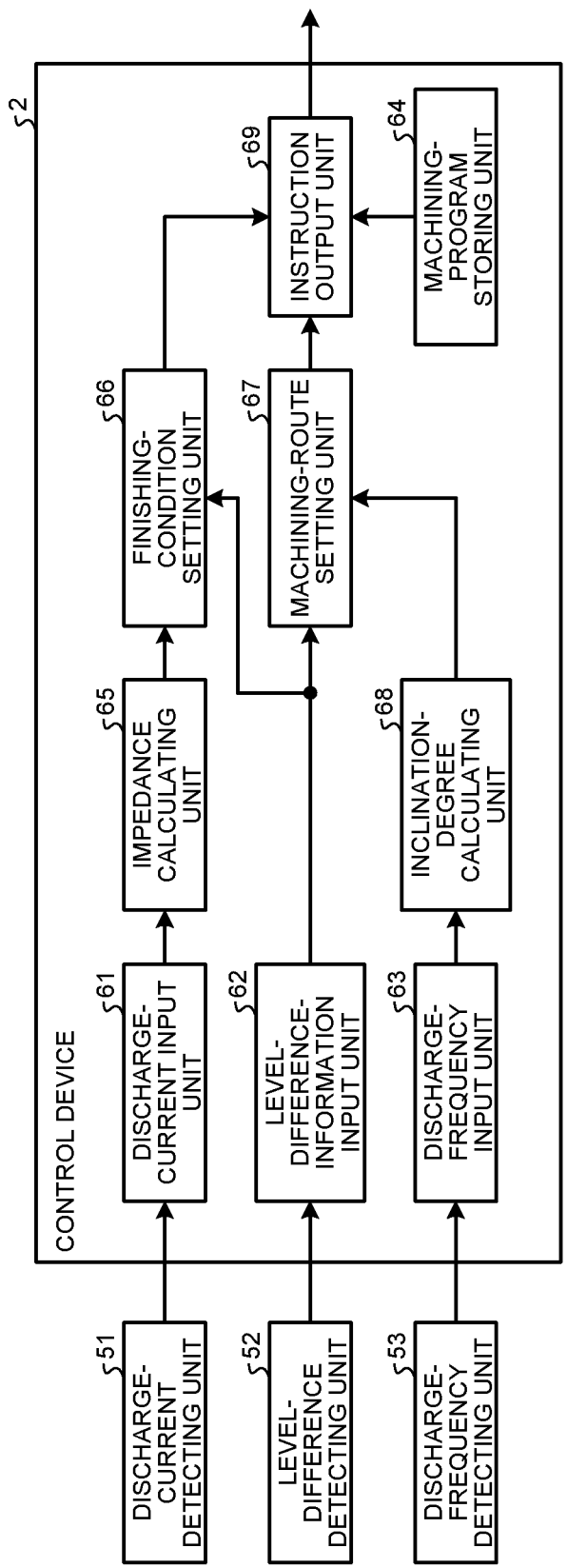
FIG. 3 is a block diagram showing the configuration of a control device.

FIG. 3 is a block diagram showing the configuration of the control device. The control device 2 includes a discharge-current input unit 61, a level-difference-information input unit 62, and a discharge-frequency input unit 63. The control device 2 includes a machining-program storing unit 64, an impedance calculating unit 65, a finishing-condition setting unit 66, a machining-route setting unit 67, an inclination-degree calculating unit 68, and an instruction output unit 69.

The discharge-current input unit 61 receives an input of the detection result sent from the discharge-current detecting unit 51 and sends the detection result to the impedance calculating unit 65. The level-difference-information input unit 62 receives an input of the detection result (level difference information) sent from the level-difference detecting unit 52 and sends the detection result to the finishing-condition setting unit 66 and the machining-route setting unit 67. The discharge-frequency input unit 63 receives an input of the detection result sent from the discharge-frequency detecting unit 53 and sends the detection result to the inclination-degree calculating unit 68.

The machining-program storing unit 64 stores a machining program used in machining the workpiece 4. In the machining program, rough machining conditions, finishing conditions, and the like are set. In the rough machining conditions or the finishing conditions, a machining route to the workpiece 4, a pulse width and a quiescent pulse width during wire electric discharge machining, and the like are set. The machining program in the machining-program storing unit 64 is sent to the instruction output unit 69.

The impedance calculating unit 65 calculates the impedance of the bridging sections 21A to 21D on the basis of the detection result (a discharge current) sent from the discharge-current detecting unit 51. The impedance calculating unit 65 sends a calculation result (the impedance) to the finishing-condition setting unit 66.

The finishing-condition setting unit 66 sets a current condition for the finishing in the residual part machining on the basis of the impedance of the bridging sections 21A to 21D. The finishing-condition setting unit 66 sets a pulse width and a quiescent pulse width during the finishing on the basis of the level difference information concerning the level difference between the machined portion by the C-shape machining and the machined portion by the residual part machining. Specifically, the finishing-condition setting unit 66 sets machining conditions for increasing the quiescent pulse width stepwise while keeping the pulse width fixed.

When a level difference equal to or larger than a predetermined value is detected between the uncut portion 7 and the outer frame portion 6, the finishing-condition setting unit 66 changes the setting of the pulse width and the quiescent pulse width. The finishing-condition setting unit 66 sends the set machining conditions to the instruction output unit 69.

The inclination-degree calculating unit 68 calculates a tilt degree (an inclination degree) of the core 5 on the basis of the change in the discharge frequency during the finishing in the approach run section or on the basis of a measurement result of the level-difference detecting unit 52. The inclination-degree calculating unit 68 sends a calculation result (the inclination degree) to the machining-route setting unit 67.

The machining-route setting unit 67 sets a machining route in which the uncut portion 7 is C-shape machined to be larger than a desired dimension. The machining-route setting unit 67 sets a machining route corresponding to the inclination degree of the core 5. Specifically, the machining-route setting unit 67 corrects the machining route on the basis of the inclination degree of the core 5. The machining-route setting unit 67 sends the set machining route to the instruction output unit 69.

The instruction output unit 69 controls the positions of the machining power supply 30 and the wire 3 on the basis of the machining program. When receiving the machining conditions from the finishing-condition setting unit 66, the instruction output unit 69 changes the machining conditions in the machining program to the received machining conditions and outputs an instruction to the machining power supply 30 on the basis of the machining conditions after the change.

When receiving the machining route from the machining-route setting unit 67, the instruction output unit 69 changes the machining route in the machining program to the received machining route and outputs an instruction to the wire 3 on the basis of the machining route after the change.

Figure 4:
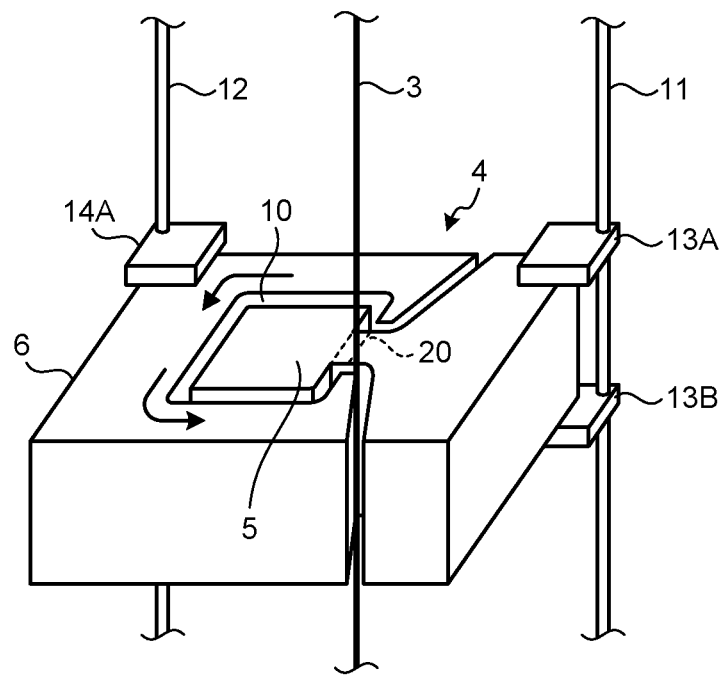
FIG. 4 is a diagram for explaining machining processing of C-shape machining.

The C-shape machining, which is the machining processing of the portions other than the uncut portion 7, and the machining processing of the uncut portion 7 are explained. FIG. 4 is a diagram for explaining machining processing of the C-shape machining. In FIG. 4, a machining route in which the C-shape machining is performed (a moving track of the wire 3) is indicated by a C-shape machining route 10 and a machining route in which the residual part machining is performed is indicated by a residual-part machining route 20.

The workpiece 4 is divided into two parts of the core 5 and the outer frame portion 6 by machining. The core 5 loses electric conductivity to the surrounding (the workpiece 4) according to cut-off from the workpiece 4. The core 5 changes to a product part by being cut off from the workpiece 4.

The workpiece 4 is held by the supporting plates 13A and 13B disposed in a bar-like supporting section 11 and is held by the supporting plates 14A and 14B disposed in the bar-like supporting section 12. Note that the supporting plate 14B is not shown.

The workpiece 4 is formed in, for example, a rectangular parallelepiped shape. At a first end portion, the upper surface side of the workpiece 4 is pressed by the supporting plate 13A and the bottom surface side of the workpiece 4 is pressed by the supporting plate 13B. At a second end portion, the upper surface side of the workpiece 4 is pressed by the supporting plate 14A and the bottom surface side of the workpiece 4 is pressed by the supporting plates 14B.

The wire 3 is stretched and suspended, for example, in the vertical direction (a direction perpendicular to a principal plane of the workpiece 4). The wire 3 machines the workpiece 4 by moving in the workpiece 4 such that the axial direction of the wire 3 substantially perpendicularly crosses the principal plane of the workpiece 4.

When performing the C-shape machining, the wire electric discharge machining apparatus 1 starts machining from the outer side of the workpiece 4 and advances the machining to the outer circumferential section of the core 5. Subsequently, the wire electric discharge machining apparatus 1 machines the outer circumferential section of the core 5 to draw a C-shape when the workpiece 4 is viewed from the upper surface side. Therefore, the wire electric discharge machining apparatus 1 moves the wire 3 to the outer side of the workpiece 4.

Consequently, the wire electric discharge machining apparatus 1 machines the workpiece 4 along the C-shape machining route 10 and forms a machining groove corresponding to the C-shape machining route 10 in the workpiece 4. When performing the C-shape machining, the wire electric discharge machining apparatus 1 performs the rough machining and performs the finishing at least once. In this way, when performing the C-shape machining, the machining is performed up to the finishing in a state in which the uncut portion 7 of the core 5 is left.

Figure 5:
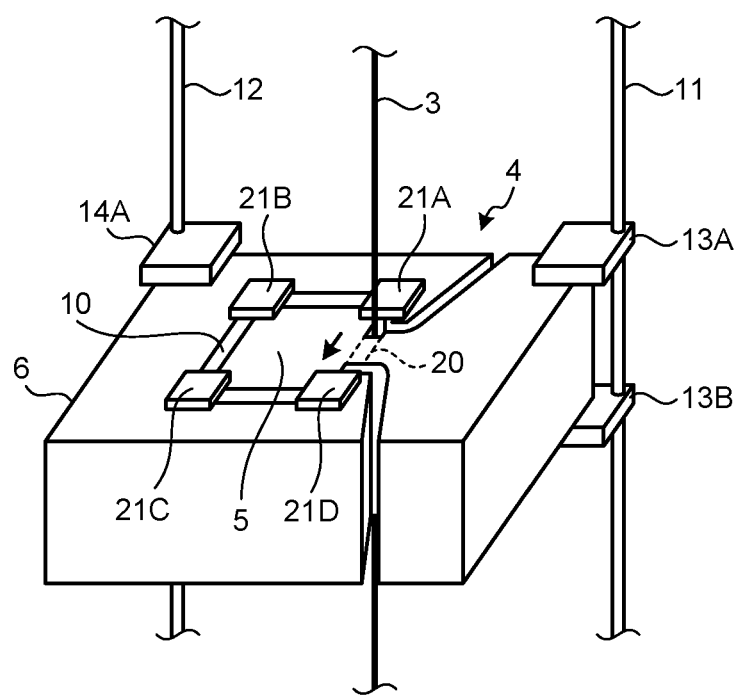
FIG. 5 is a diagram for explaining machining processing of an uncut portion.

FIG. 5 is a diagram for explaining the machining processing of the uncut portion. In the wire electric discharge machining apparatus 1, after the C-shape machining is performed, the outer frame portion 6 of the workpiece 4 (the outer side of the machining groove) and the core 5 (the inner side of the machining groove) are bridged by the bridging sections 21A to 21D. The wire electric discharge machining apparatus 1 performs the residual part machining on the uncut portion 7 of the workpiece 4. The bridging sections 21A to 21D are respectively disposed in, for example, four corner portions of the core 5. At this point, the bridging sections 21A to 21D are disposed such that the outer frame portion 6 of the workpiece 4 and the core 5 can conduct via the bridging sections 21A to 21D.

When performing the residual-part machining, the wire electric discharge machining apparatus 1 moves the wire 3 to the uncut portion 7 along the machining groove (a first side) formed in the C-shape machining. The wire electric discharge machining apparatus 1 machines the uncut portion 7 of the workpiece 4 along the residual-part machining route 20. When performing the residual part machining, the wire electric discharge machining apparatus 1 performs the rough machining and performs the finishing at least once. Consequently, the uncut portion 7 of the core 5 is machined. Thereafter, the wire electric discharge machining apparatus 1 moves the wire 3 to the outer side of the workpiece 4. The bridging sections 21A to 21D are detached from the workpiece 4 and the core 5.

Note that the bridging sections 21A to 21D can be disposed in any position as long as the position is between the workpiece 4 and the uncut portion 7 (on the machined machining groove). The number of bridging sections 21A to 21D is not limited to four and can be three or less or five or more.

Figure 6:
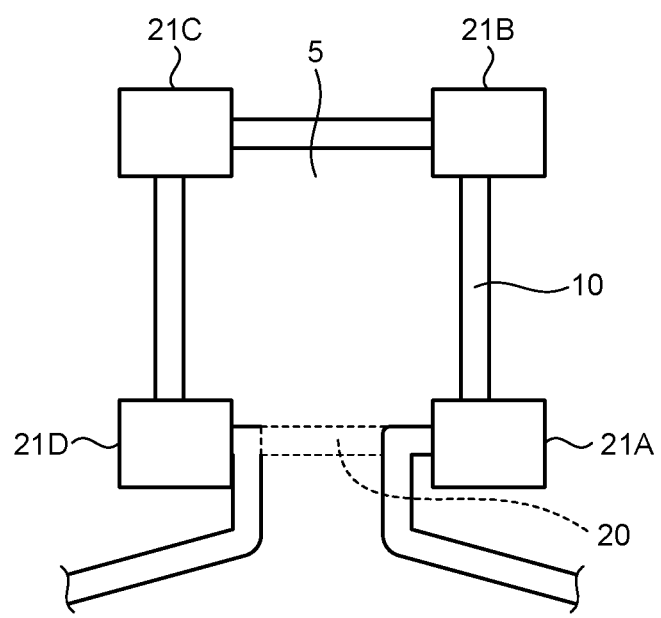
FIG. 6 is a diagram for explaining a C-shape machining route and a residual-part machining route.

FIG. 6 is a diagram for explaining the C-shape machining route and the residual-part machining route. In FIG. 6, a top view of the workpiece 4 is shown. In the workpiece 4, after the C-shape machining is performed along the C-shape machining route 10, which is the outer side of the core 5, the bridging sections 21A to 21D are disposed on the workpiece 4. Thereafter, in the workpiece 4, the residual part machining is performed along the residual-part machining route 20.

Machining processing of the uncut 7 is explained. In this embodiment, when machining the uncut portion 7, the wire electric discharge machining apparatus 1 executes at least one of (1) to (6) explained above.

(1) Processing for Feeding Electric Power from the Power Feeding Terminal 9B on a Far Side to the Wire 3

Figure 7:
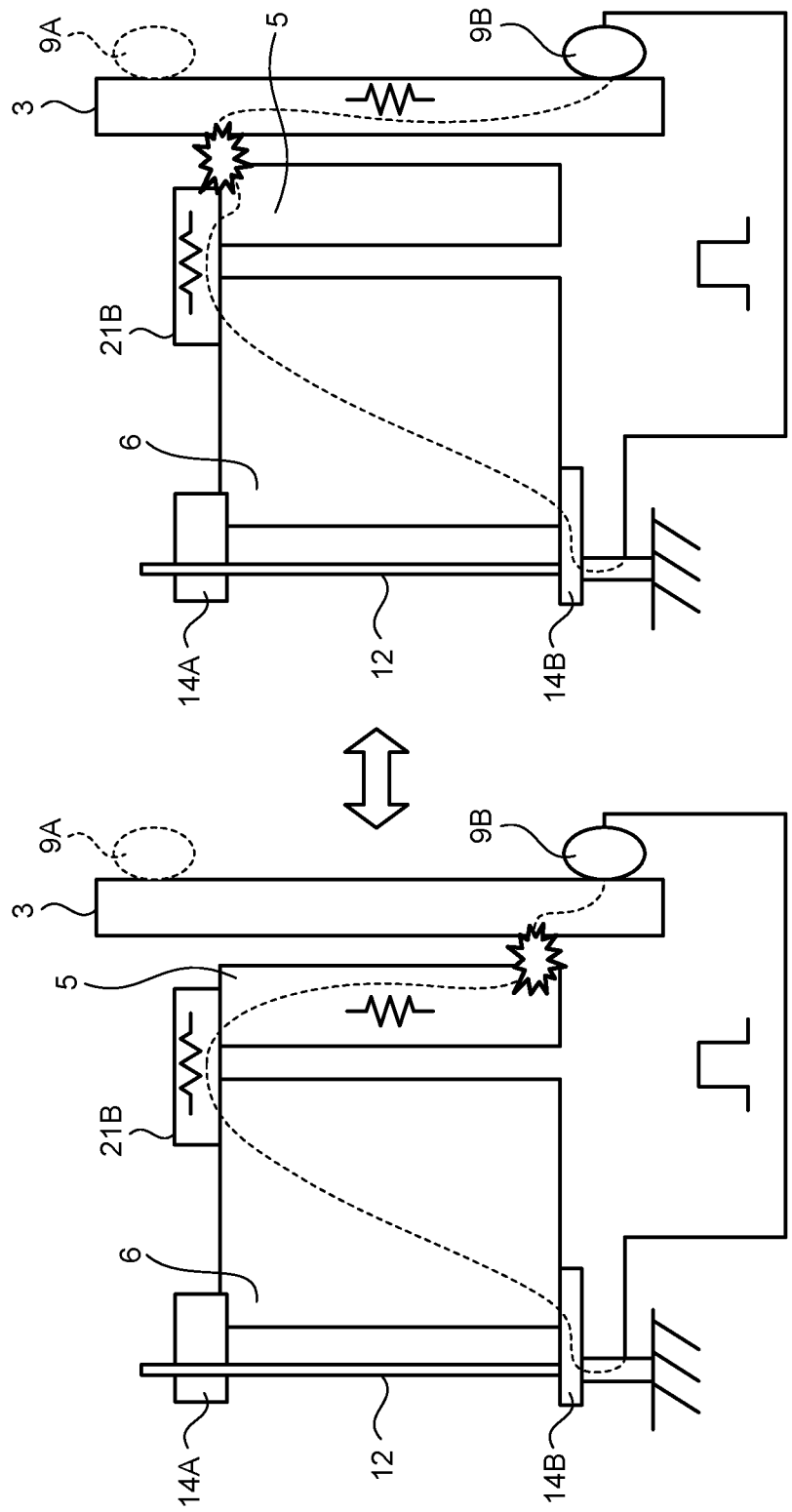
FIG. 7 is a diagram showing a discharge state in a power feeding method according to the embodiment.

FIG. 7 is a diagram showing a discharge state in a power feeding method according to this embodiment. In FIG. 7, a sectional view of the workpiece 4 in the case of lower side power feeding. Electric resistance at the time when electric discharge occurs in the vicinity of the bridging section 21B is explained.

In the wire electric discharge machining apparatus 1, the power feeding terminals 9A and 9B are connected to the wire 3. The power feeding terminal 9A is a power feeding terminal disposed in a position close from the bridging section 21B. The power feeding terminal 9B is a power feeding terminal disposed in a position far from the bridging section 21B.

In this embodiment, during the rough machining and during the finishing of the C-shape machining, the machining power supply 30 feeds electric power from the power feeding terminals 9A and 9B to the wire 3. During the rough machining of the residual part machining, the machining power supply 30 feeds electric power from the power feeding terminals 9A and 9B to the wire 3.

In the finishing of the residual part machining, the machining power supply 30 feeds electric power from the power feeding terminal 9B, which is disposed in a position on a side apart from the bridging section 21B, and does not feed electric power from the power feeding terminal 9A. Consequently, in the finishing of the residual part machining, the wire 3 and the workpiece 4 are energized using only the power feeding terminal 9B on the lower side.

For example, when the bridging section 21B is disposed on the upper surface side of the workpiece 4, the power feeding terminal 9A is disposed on the upper surface side of the workpiece 4 and the power feeing terminal 9B is disposed on the bottom surface side of the workpiece 4. In the finishing, a voltage is applied to between the wire 3 and the workpiece 4 from the power feeding terminal 9B via the wire 3.

The core 5 and the outer frame portion 6 are electrically connected by the partially bridged bridging section 21B. The bridging section 21B has high electric resistance. The core 5 also has high electric resistance depending on a machining shape. Therefore, the bridging section 21B or the core 5 sometime affects the machining.

Therefore, to reduce the influence on the machining, in the finishing, the wire electric discharge machining apparatus 1 feeds electric power from only the power feeding terminal 9B far from the bridging section 21B. In this way, in the finishing, the machining power supply 30 and the wire 3 are connected only on the lower side (the power feeding terminal 9B).

In this case, as shown on the left side of FIG. 7, when electric discharge occurs on the lower side (the bottom surface side) of the workpiece 4 (the core 5), an electric current from the power feeing terminal 9B flows through the wire 3, the core 5, the bridging section 21B, and the outer frame portion 6. In the wire 3, the electric current flows to only the vicinity of the lower side of the wire 3. In the core 5, the electric current flows from the bottom surface side to the upper surface side of the core 5.

As shown on the right side of FIG. 7, when electric discharge occurs on the upper side (the upper surface side) of the workpiece 4 (the core 5), the electric current from the power feeding terminal 9B flows through the wire 3, the core 5, the bridging section 21B, and the outer frame portion 6. In the wire 3, the electric current flows from the lower side to the upper side of the wire 3. In the core 5, the electric current flows to only the vicinity of the upper side of the core 5.

Therefore, in the case of the lower side power feed, because a resistance difference between the time when the electric discharge occurs on the lower side of the core 5 and the time when the electric discharge occurs on the upper side of the core 5 is small, a difference between discharge currents is also small. Therefore, machining energy in the plate thickness direction of the workpiece 4 stabilizes.

Figure 8:
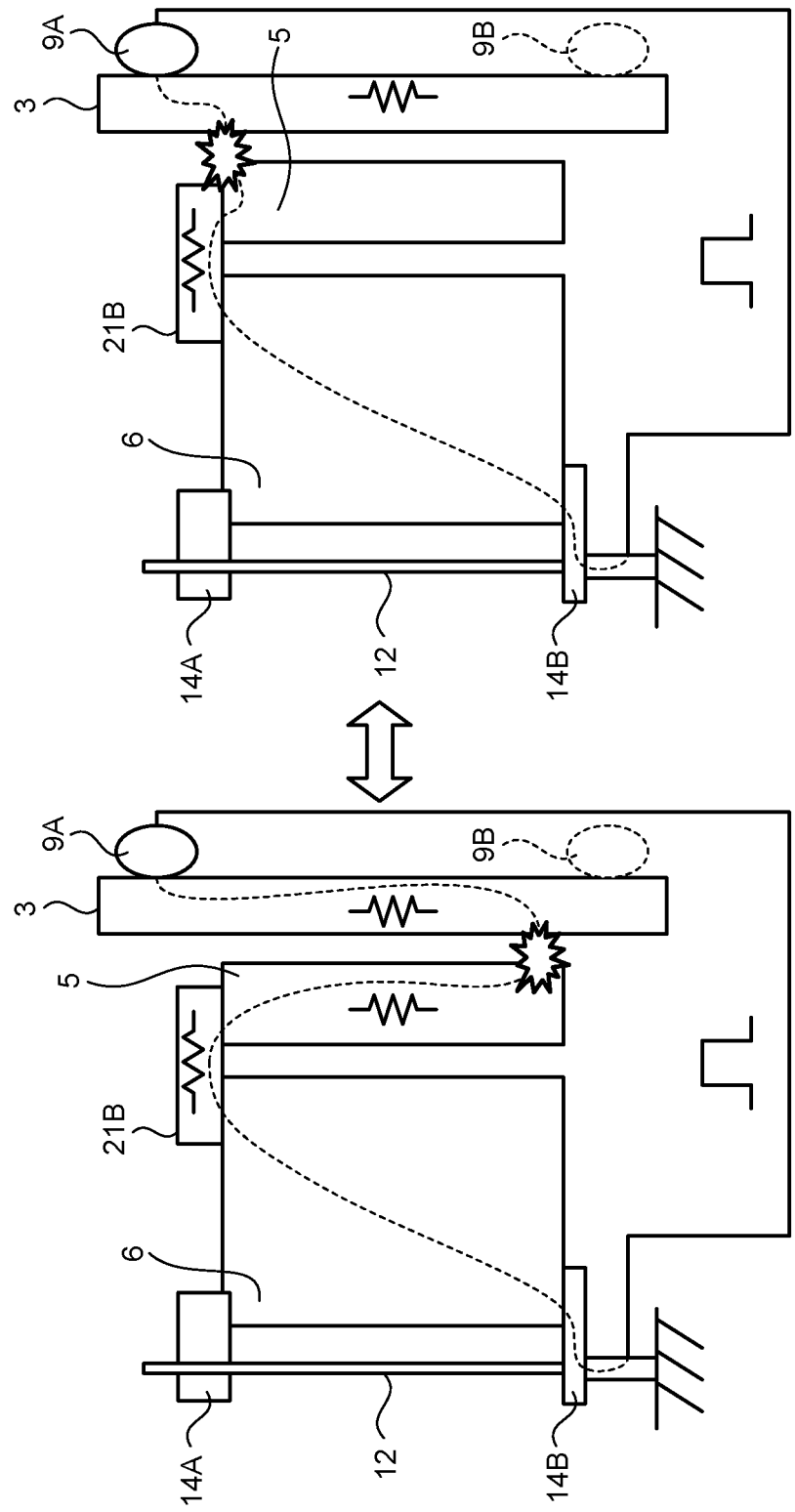
FIG. 8 is a diagram showing a discharge state at the time when electric power is fed from a power feeding terminal, which is disposed in a position on a side close to a bridging section, to a wire.

FIG. 8 is a diagram showing a discharge state at the time when electric power is fed from the power feeding terminal disposed in the position close to the bridging section to the wire. In FIG. 8, a sectional view of the workpiece 4 in upper side power feed is shown. Electric resistance at the time when electric discharge occurs in the vicinity of the bridging section 21B is explained.

If electric power is fed from the power feeding terminal 9A disposed in the position close to the bridging section 21B to the wire 3 and electric power is not fed from the power feeding terminal 9B to the wire 3, the wire 3 and the workpiece 4 are energized using only the power feeding terminal 9A on the upper side.

In this case, as shown on the left side of FIG. 8, when electric discharge occurs on the lower side (the bottom surface side) of the workpiece 4 (the core 5), an electric current from the power feeing terminal 9A flows through the wire 3, the core 5, the bridging section 21B, and the outer frame portion 6. In the wire 3, the electric current flows from the upper side to the lower side of the wire 3. In the core 5, the electric current flows from the bottom surface side to the upper surface side of the core 5.

As shown on the right side of FIG. 8, when electric discharge occurs on the upper side (the upper surface side) of the workpiece 4 (the core 5), the electric current from the power feeding terminal 9A flows through the wire 3, the core 5, the bridging section 21B, and the outer frame portion 6. In the wire 3, the electric current flows to only the vicinity of the upper side of the wire 3. In the core 5, the electric current flows to only the vicinity of the upper side of the core 5.

Therefore, in the case of the upper side power feed, because a resistance difference between the time when the electric discharge occurs on the lower side of the core 5 and the time when the electric discharge occurs on the upper side of the core 5 is large, a difference between discharge currents is also large. Therefore, machining energy in the plate thickness direction of the workpiece 4 varies.

On the other hand, in the lower side power feed, because the machining energy in the plate thickness direction of the workpiece 4 stabilizes, it is possible to stably perform the finishing of the core 5. Therefore, as in the machined portion, it is possible to obtain satisfactory machining accuracy in the machining of the uncut portion 7.

(2) Processing for correcting machining conditions in the residual part machining on the basis of a machining state in the C-shape machining.

In the core 5 after the C-shape machining is performed, electric conductivity is secured by the conductive bridging sections 21A to 21D. However, conduction states are different in a state during the C-shape machining and in a state in which the bridging sections 21A to 21D are connected after the C-shape machining. Therefore, a difference occurs in machining energy between both the states. Therefore, the wire electric discharge machining apparatus 1 corrects machining conditions (an electric current, a voltage, a pulse width, a resistance value, etc.) in at least the finishing in the residual part machining on the basis of a machining state in the C-shape machining.

Figure 9:
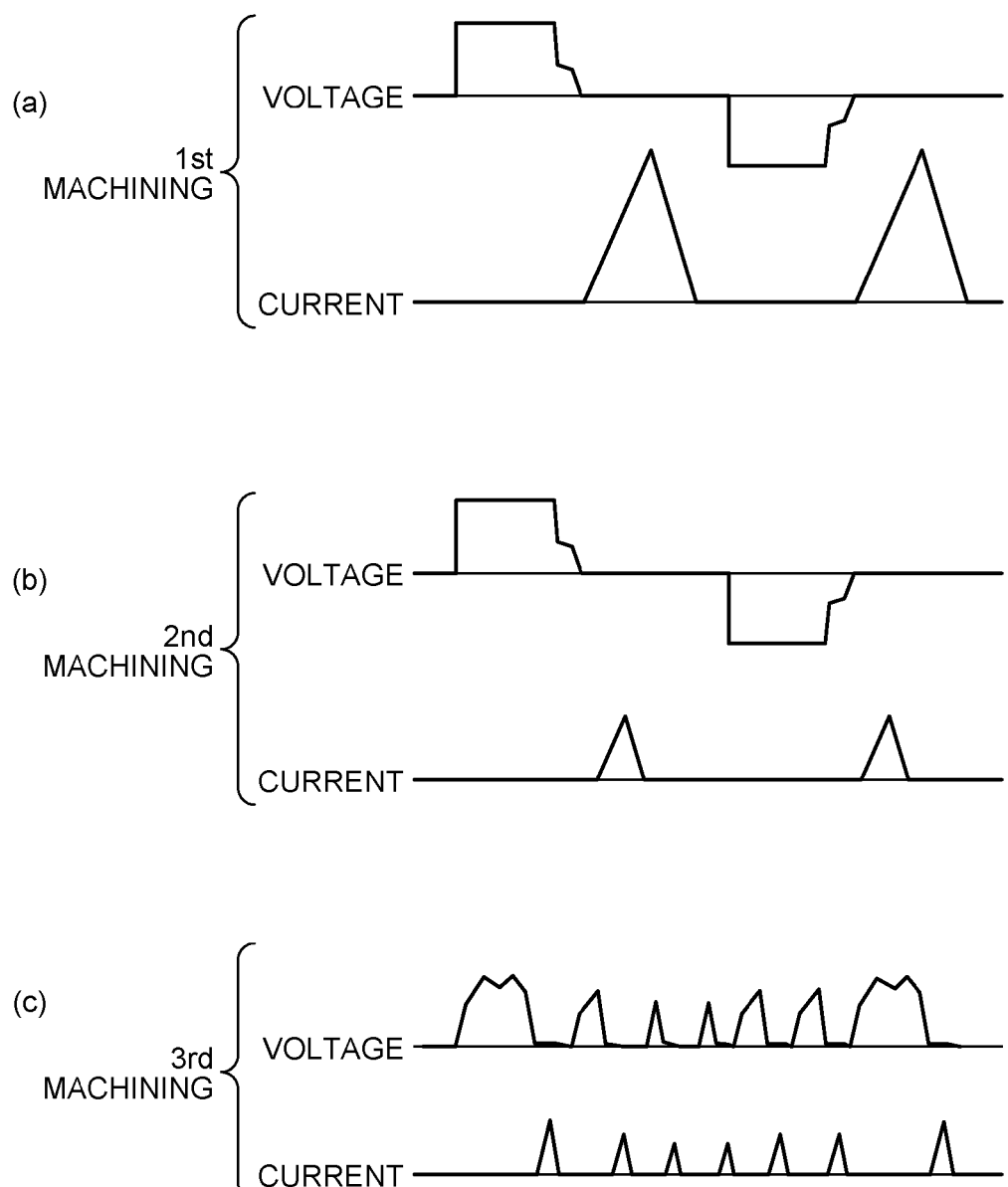
FIG. 9 is a diagram schematically showing voltage and current waveforms during finishing at the time when the C-shape machining is executed in a state in which an uncut portion is connected to a core.

FIG. 9 is a diagram schematically showing voltage and current waveforms during the finishing at the time when the C-shape machining is executed in a state in which the uncut portion is connected to the core. As an example of the current and voltage waveforms, voltage and current waveforms of 1st machining shown in FIG. 9(*a*), 2nd machining shown in FIG. 9(*b*), and 3rd machining shown in FIG. 9(*c*) are shown.

In machining, for example, machining with machining energy (a machining current) gradually reduced from the 1st machining is performed. In the 1st machining and the 2nd machining, the wire electric discharge machining apparatus 1 applies a voltage pulse and stops the voltage pulse after electric discharge detection. Consequently, a current pulse is supplied to the workpiece 4. Thereafter, in the 3rd machining, the wire electric discharge machining apparatus 1 performs machining with group pulse oscillation that makes use of current limiting resistance. At this point, the wire electric discharge machining apparatus 1 causes, for example, a switching element SW1 to perform an ON/OFF operation in a circuit configuration shown in FIG. 18 explained below to suppress a machining current flowing during electric discharge and perform the finishing.

Figure 10:
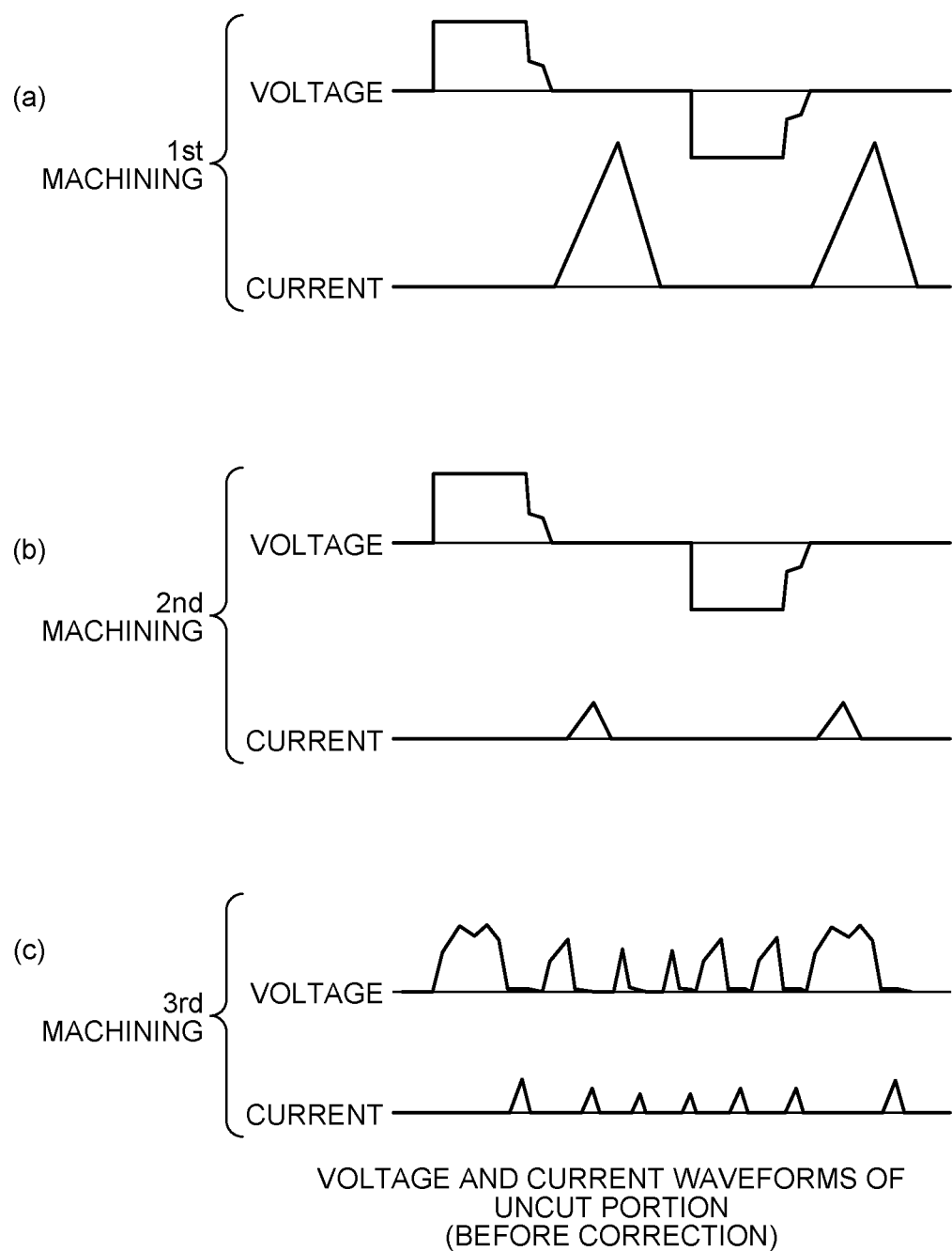
FIG. 10 is a diagram schematically showing voltage and current waveforms before correction during the finishing at the time when residual part machining is executed on the uncut portion.

FIG. 10 is a diagram schematically showing voltage and current waveforms before correction during the finishing at the time when the residual part machining is executed on the uncut portion. For explanation, in FIG. 10, uncorrected voltage and current waveforms are shown to correspond to FIG. 9. Specifically, in FIG. 10(*a*), voltage and current waveforms during the 1st machining are shown, in FIG. 10(*b*), voltage and current waveforms during the 2nd machining are shown, and, in FIG. 10(*c*), voltage and current waveforms during the 3rd machining are shown After the C-shape machining is performed from the 1st machining to the 3rd machining, the bridging sections 21A to 21D are formed, and an uncut portion is machined. At this point, in the 1st machining, it can be considered that machining same as the 1st machining of the C-shape machining is possible. In FIG. 10(*b*), a voltage waveform and a current waveform before correction during the 2nd machining (during first finishing) after the cut-off of the uncut portion 7 from the core 5 are shown.

As shown in FIG. 9(*b*) and FIG. 10(*b*), an electric current during 2nd cut in machining the uncut portion 7 is smaller than an electric current during the 2nd cut at the time when the uncut portion 7 is entirely left. Therefore, a difference occurs in machined surface roughness of a final finished surface between the C-shape machining and the residual part machining.

Therefore, in this embodiment, the discharge-current detecting unit 51 detects an electric current during the 2nd cut in the C-shape machining and an electric current during the 2nd cut in the residual part machining. The impedance calculating unit 65 calculates the impedance of the bridging sections 21A to 21D on the basis of the detected electric currents.

At this point, the impedance calculating unit 65 causes a memory (not shown in the figures) or the like to store, in advance, current peak values of the electric currents detected by the discharge-current detecting unit 51. The impedance calculating unit 65 calculates an average of the current peak values during the C-shape machining and calculates the impedance of the bridging sections 21A to 21D on the basis of the average. The impedance calculating unit 65 calculates an average of the current peak values during the residual part machining and calculates the impedance of the bridging sections 21A to 21D on the basis of the average. The impedance calculating unit 65 calculates an impedance difference, which is a difference between the impedance during the C-shape machining and the impedance during the residual part machining.

The finishing-condition setting unit 66 sets machining conditions corresponding to the impedance difference as machining conditions during the 3rd cut in the residual part machining. Specifically, the finishing-condition setting unit 66 corrects an electric current of the current peaks during the residual part machining such that the current peaks during the residual part machining are the same as the current peak values during the C-shape machining. In other words, the finishing-condition setting unit 66 sets current conditions under which the impedance difference is zero as the machining conditions during the 3rd cut in the residual part machining.

Figure 11:
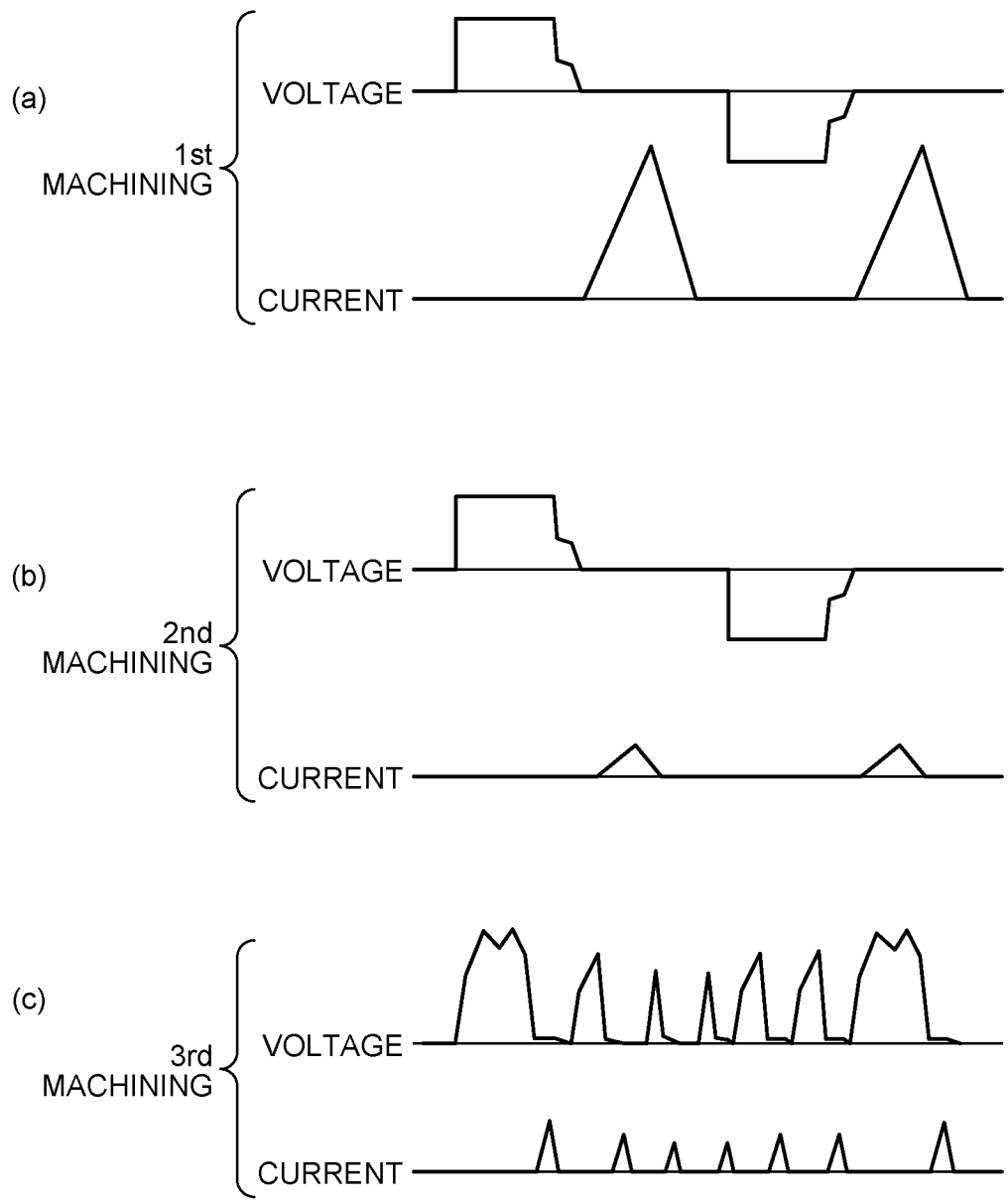
FIG. 11 is a diagram schematically showing voltage and current waveforms after the correction during the finishing at the time when the residual part machining is executed on the uncut portion.

FIG. 11 is a diagram schematically showing voltage and current wave forms after the correction during the finishing at the time when the residual part machining is executed on the uncut portion. In FIG. 11, corrected voltage and current waveforms are shown to correspond to FIG. 9. Specifically, in FIG. 11(*a*), voltage and current waveforms during the 1st machining are shown, in FIG. 11(*b*), voltage and current waveforms during the 2nd machining are shown, and, in FIG. 11(*c*), voltage and current waveforms during the 3rd machining are shown.

The finishing-condition setting unit 66 changes a machining condition (an electric current) in the 3rd cut during the residual-part machining such that current peak values are the same during the residual part machining and the C-shape machining.

Consequently, an electric current during the 2nd cut in the C-shape machining and an electric current (a charge amount) during the 3rd cut in the residual-part machining are substantially the same. Consequently, it is possible to align surface roughness of the core 5 in the C-shape machining and surface roughness of the core 5 in the residual part machining.

Note that the wire electric discharge machining apparatus 1 can correct electric currents during M-th (M is a natural number) and subsequent cuts in the residual part machining such that an electric current during an N-th (N is a natural number) cut in the C-shape machining and electric currents during the M-th and subsequent cuts in the residual part machining are the same.

For example, the wire electric discharge machining apparatus 1 can correct electric currents in 4th and subsequent cuts during the residual part machining such that an electric current during the 2nd cut in the C-shape machining and electric currents in the 4th and subsequent cuts in the residual part machining are the same.

The wire electric discharge machining apparatus 1 can set an electric current during the residual part machining on the basis of an electric current during the C-shape machining without referring to an electric current during the residual part machining. The wire electric discharge machining apparatus 1 can correct an electric current halfway during the 2nd cut such that an electric current during the 2nd cut in the residual part machining is the same as an electric current during the 2nd cut in the C-shape machining. In this case, electric currents after an initial stage during the 2nd cut in the residual part machining are corrected on the basis of the electric current during the 2nd cut in the C-shape machining and an electric current in the initial stage during the 2nd cut in the residual part machining.

(3) Processing for Increasing a Quiescent Pulse Width Stepwise and Performing Additional Machining while Keeping a Pulse Width Fixed when there is a Machining Level Difference Between the C-Shape Machining and the Residual Part Machining After the C-shape machining is completed, the level-difference detecting unit 52 detects a level difference between a machined C-shape machined portion and the machined uncut portion 7 (residual part machined portion). In other words, after the C-shape machining is completed, the level-difference-detecting unit 52 detects a level difference that occurs in a seam portion between the C-shape machined portion and the residual part machined portion.

The detected level difference (a detection result) is sent to the finishing-condition setting unit 66 of the control device 2 as level difference information. The finishing-condition setting unit 66 sets a pulse width and an quiescent pulse width during the finishing on the basis of the level difference information. At this point, the finishing-condition setting unit 66 sets machining conditions for increasing the quiescent pulse width stepwise while keeping the pulse width fixed. The pulse width at this point is a pulse width used immediately before the level difference information is acquired. In other words, the pulse width is a pulse width during the last finishing of the uncut portion 7 (the last pulse width set in the machining program). The finishing-condition setting unit 66 sets, for example, a quiescent pulse width corresponding to the size of the level difference.

The finishing-condition setting unit 66 sends the set quiescent pulse width to the instruction output unit 69. When receiving the machining conditions from the finishing-condition setting unit 66, the instruction output unit 69 changes the machining conditions in the machining program to the received machining conditions and outputs an instruction to the machining power supply 30 on the basis of the machining conditions after the change.

Figure 12:
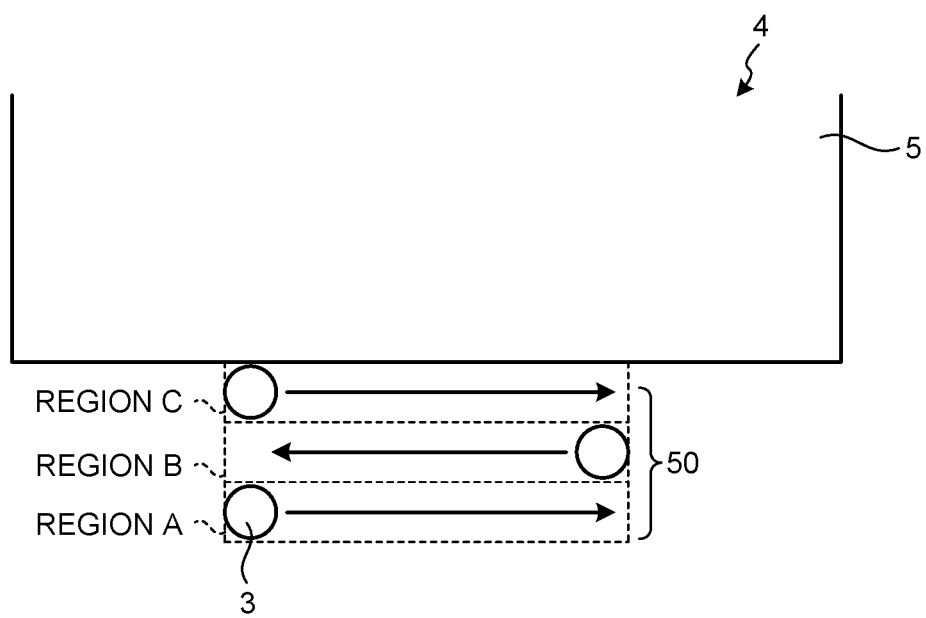
FIG. 12 is a diagram for explaining additional machining during level difference detection.
Figure 13:
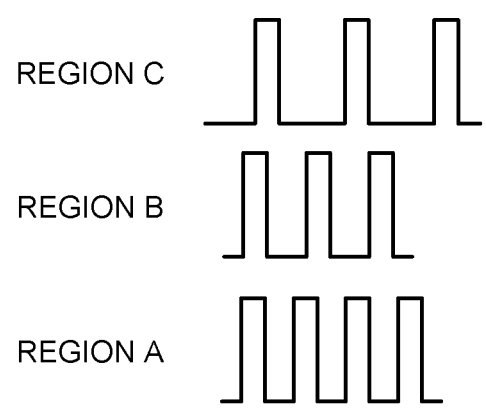
FIG. 13 is a diagram for explaining a quiescent pulse width during the additional machining.

FIG. 12 is a diagram for explaining additional machining during the level difference detection. FIG. 13 is a diagram for explaining a quiescent pulse width during the additional machining. A level difference sometimes occurs between a C-shape machined portion and a residual part machined portion. The level difference is a level difference at the time when the core 5 is viewed from the upper surface side (unevenness viewed from a main axis direction of the wire 3). For example, when a boundary between the C-shape machined portion and the residual part machined portion is not linear in the core 5, a level difference of the core 5 is detected. Specifically, the level difference of the core 5 is detected, for example, when the residual part machined portion is a convex shape or a concave shape with respect to the C-shape machined portion.

For example, a difference between electric currents generated in the 2nd cut (a difference between an electric current during the C-shape machining and an electric current during the residual part machining) is a dimensional difference of the core 5. When machining conditions such as machining liquid pressure changes before and after the cut-off of the uncut portion 7, the change leads to a dimension error of the core 5. These dimension errors sometimes appear as a level difference shape even when the surface roughness of the finished surface can be aligned as in (2).

In such a case, in this embodiment, after the machining conditions are changed to eliminate the level difference, the additional machining on the core 5 is performed. As shown in FIG. 12, when a level difference (a projecting section 50) remains between the C-shape machined portion and the residual part machined portion after completion of the residual part machining, the additional machining is performed on the projecting section 50.

At this point, the wire electric discharge machining apparatus 1 gradually brings the wire 3 closer to the core 5 and performs the additional machining to form the C-shape machined portion and the residual part machined portion on the same plane. In the additional machining, the wire electric discharge machining apparatus 1 adjusts machining energy while aligning the surface roughness. Therefore, the wire electric discharge machining apparatus 1 adjusts a quiescent pulse width while keeping a pulse width of an applied waveform at the same width.

When setting machining conditions for the additional machining, the finishing-condition setting unit 66 sets machining conditions for increasing the quiescent pulse width stepwise while keeping the pulse width fixed. In other words, the finishing-condition setting unit 66 sets, for each of regions in the projecting section 50, the machining conditions such that the quiescent pulse width increases stepwise.

For example, as shown in FIG. 12, the finishing-condition setting unit 66 sets machining conditions for a region A in the projecting section 50. At this point, for example, as shown in FIG. 13, the finishing-condition setting unit 66 sets, for the region A, a quiescent pulse width (a first quiescent pulse width) larger than the quiescent pulse width during the finishing while keeping the pulse width fixed. Consequently, the area A is additionally machined under the set machining conditions.

When the level difference remains even after the additional machining on the region A, the finishing-condition setting unit 66 sets machining conditions for a region B in the projecting section 50. At this point, the finishing-condition setting unit 66 sets, for the region B, a quiescent pulse width (a second quiescent pulse width) larger than the quiescent pulse width during the machining in the region A while keeping the pulse width fixed. Consequently, the region B is additionally machined under the set machining conditions.

Further, when the level difference remains even after the additional machining on the region B, the finishing-condition setting unit 66 sets machining conditions for a region C in the projecting section 50. At this point, the finishing-condition setting unit 66 sets, for the region C, a quiescent pulse width (a third quiescent pulse width) larger than the quiescent pulse width during the machining in the region B while keeping the pulse width fixed. Consequently, the region C is additionally machined under the set machining conditions. In the wire electric discharge machining apparatus 1, the setting of machining conditions for the level difference and the additional machining are repeated until the level difference is eliminated.

Figure 14:
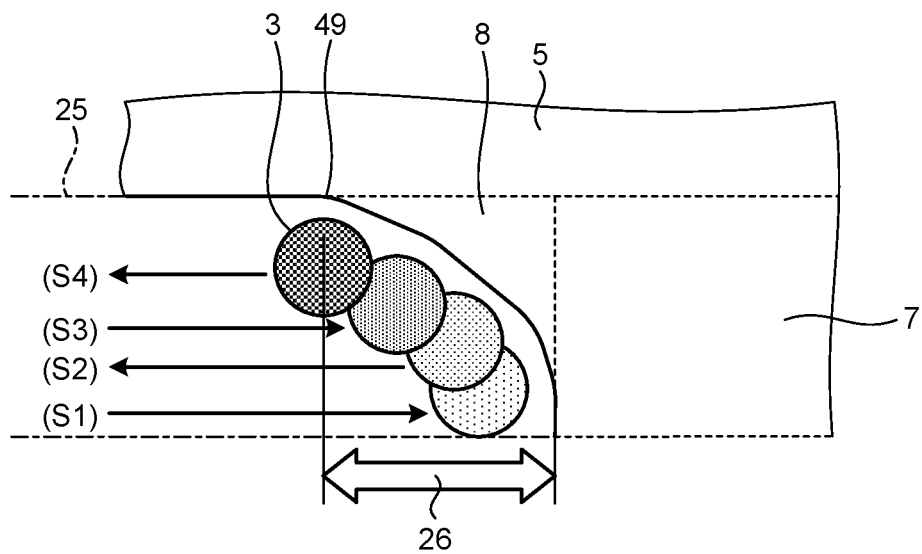
FIG. 14 is a diagram for explaining a machining route at the time when the uncut portion is C-shape machined to be larger than a desired dimension.

(4) Processing for C-Shape Machining the Vicinity of the Uncut Portion 7 to be Larger than a Desired Dimension FIG. 14 is a diagram for explaining a machining route in C-shape machining (machining on the first boundary region) the uncut portion to be larger than a desired dimension. The machining-route setting unit 67 sets a machining route in which the uncut portion 7 (the second boundary region) is C-shape machined to be larger than the desired dimension.

The machining-route setting unit 67 sets, for the C-shape machining, a machining route in which an approach run section region 8 used during the finishing of the uncut portion 7 and a desired uncut portion 7 remain. The approach run section region 8 is a part of the uncut portion 7. By providing the approach run section region 8, the uncut portion 7 is larger than the desired dimension.

The approach run section region 8 is a region (a second region) used as an approach run section (a cut-off approach run section 26) to a portion (a first region) other than the approach run section region 8 in the uncut portion 7, during the finishing of the uncut portion 7. When the workpiece 4 is viewed from the upper surface, the approach run section region 8 has a side (a second side) in contact with the core 5 (a finish target surface 25), a side in contact with the uncut portion 7, and a side machined during the C-shape machining. Note that the side machined during the C-shape machining can be a curved line.

The machining-route setting unit 67 sets a machining route during the C-shape machining such that a vertex 49 between the side in contact with the core 5 and the side (the first side) machined during the C-shape machining has, for example, an angle smaller than 45 degrees. In other words, the machining route is set such that the uncut portion 7 has a side crossing a machining direction in machining the approach run section region 8 (a direction of the side in contact with the core 5). In FIG. 14, as the machining route in the C-shape machining, a machining route from first finishing (S1) to fourth finishing (S4) is shown. After the bridging sections 21A to 21D are detached from the workpiece 4 and the core 5, the core 5 as the product part is surrounded by the first side formed by the C-shape machining, the second side formed by machining on the approach run section region 8, and a third side formed by machining on portions other than the approach run section region 8 in the uncut portion 7.

In this way, in the machining during the C-shape machining, the wire electric discharge machining apparatus 1 forms the approach run section region 8 having a gentle shape in a form of providing an offset in the uncut portion 7. In other words, the wire electric discharge machining apparatus 1 forms a machining dimension of the core 5 rather large in advance by finishing the uncut portion 7 further on a rough machined region side than the finish target surface 25. The wire electric discharge machining apparatus 1 sets a section having the rather large dimension as an approach run section during the machining of the uncut portion 7 (during the residual part machining). In the finishing during the residual apart machining, the wire electric discharge machining apparatus 1 starts the machining from the set approach run section.

Figure 15:
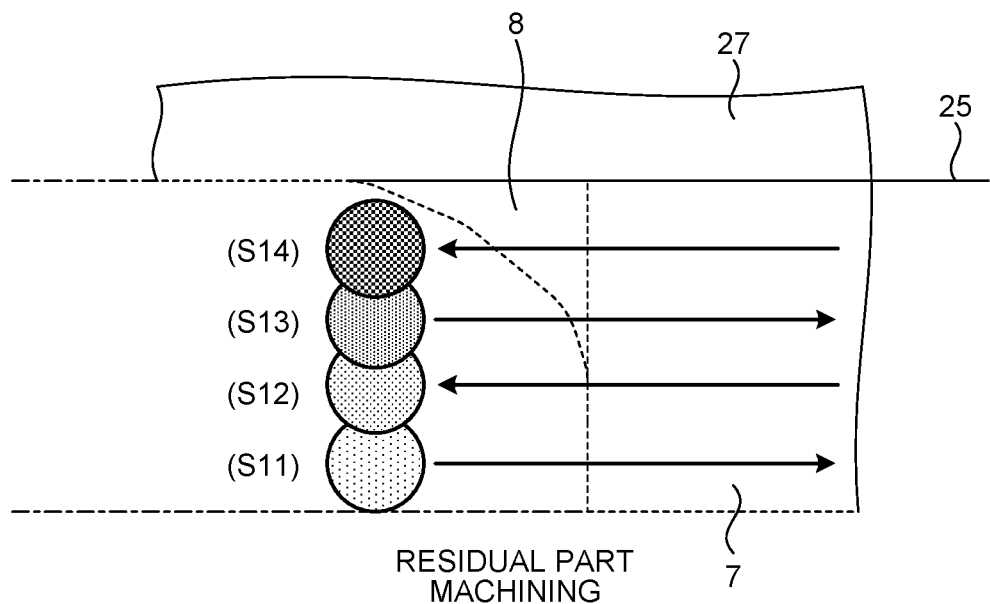
FIG. 15 is a diagram for explaining a machining route of the residual part machining at the time when the uncut portion is C-shape machined to be larger than the desired dimension.

FIG. 15 is a diagram showing a machining route of the residual part machining at the time when the uncut portion is C-shape machined to be larger than the desired dimension. When the uncut portion 7 is C-shape machined to be larger than the desired dimension (when the approach run section region 8 is formed), the machining-route setting unit 67 sets, for the residual part machining, a machining route for machining the approach run section region 8 and the uncut portion 7. In FIG. 15, as a machining route in the residual portion machining, a machining route from first finishing (S11) to fourth finishing (S14) is shown.

In this way, the wire electric discharge machining apparatus 1 provides the region machined during the finishing of the C-shape machining, the region machined during the finishing of the residual part machining, and the approach run section region 8. Therefore, it is possible to reduce a machining error that occurs between the C-shape machined portion and the residual part machined portion. As a result, it is possible to reduce streak-like machining traces.

(5) Processing for Setting, as a Finishing Condition for the Approach Run Section, a Finishing Condition in which a Pulse Width is the Same as and a Quiescent Pulse Width is Different from a Finishing Condition for the Uncut Portion 7 when Compared with the Finishing Condition The finishing-condition setting unit 66 sets, as a finishing condition for the approach run section, a finishing condition in which a pulse width is the same as and a quiescent pulse width is different from a finishing condition for the uncut portion 7 when compared with the finishing condition. In other words, the finishing-condition setting unit 66 sets pulses having the same pulse width and different quiescent pulse widths as a pulse applied in the approach run section and a pulse applied in performing the residual part machining of the uncut portion 7. For example, the finishing-condition setting unit 66 uses a pulse in any one of the regions A to C shown in FIG. 13 as a pulse applied in the finishing in the approach run section.

Consequently, it is possible to align the surface roughness in the C-shape machining and the residual part machining because the pulse widths can be aligned. It is possible to perform shape correction because machining energy can be gradually increased by adjustment of the quiescent pulse width. Therefore, by using the approach run section, it is possible to reduce a machining error that occurs between the C-shape machined portion and the residual part machined portion. As a result, it is possible to reduce streak-like machining traces.

(6) Processing for Calculating a Tilt Degree of the Core 5 on the Basis of a Machining Pulse in the Approach Run Section and Correcting a Machining Route in Performing the Residual Part Machining According to the Tilt Degree The machining-route setting unit 67 adjusts a machining route on the basis of a tilt degree of the approach run section (a tilt degree of the core 5) inclining with respect to the finish surface of the C-shape machining. At this point, the machining-route setting unit 67 sets the machining route such that a finish surface (the first side) of the C-shape machining and a finish surface (the third side) of the uncut portion 7 are the same plane.

A discharge frequency in wire electric discharge machining changes according to a machining angle to a machining target (an angle of a machining route). Therefore, the discharge-frequency detecting unit 53 detects a change in a discharge frequency (machining pulse timing) at the time when the approach run section is finished and sends a detection result to the control device 2.

The inclination-degree calculating unit 68 causes a memory (not shown in the figures) or the like to store the discharge frequency of the finishing in the approach run section in advance. The inclination-degree calculating unit 68 calculates a tilt degree (a shift) with respect to the outer frame portion 6 of the core 5 on the basis of the change in the discharge frequency of the finishing in the approach run section. The tilt is a tilt of the core 5 at the time when the workpiece 4 is viewed from the upper surface side.

Specifically, the inclination-degree calculating unit 68 causes the memory to store, in advance, a change in a discharge frequency during P-th (P is a natural number) cut in machining the uncut portion 7 and calculates an inclination degree of the core 5 on the basis of the change in the discharge frequency. The inclination-degree calculating unit 68 sends a calculation result (the inclination degree) to the machining-route setting unit 67. The machining-route setting unit 67 corrects machining routes during Q-th (Q is a natural number larger than P) and subsequent cuts of the uncut portion 7 according to the tilt degree of the core 5.

The wire electric discharge machining apparatus 1 calculates the tilt degree of the core 5 on the basis of, for example, a change in a discharge frequency during the 2nd cut in machining the uncut portion 7. The wire electric discharge machining apparatus 1 corrects machining routes during 3rd and subsequent cuts according to the tilt degree of the core 5.

Figure 16:
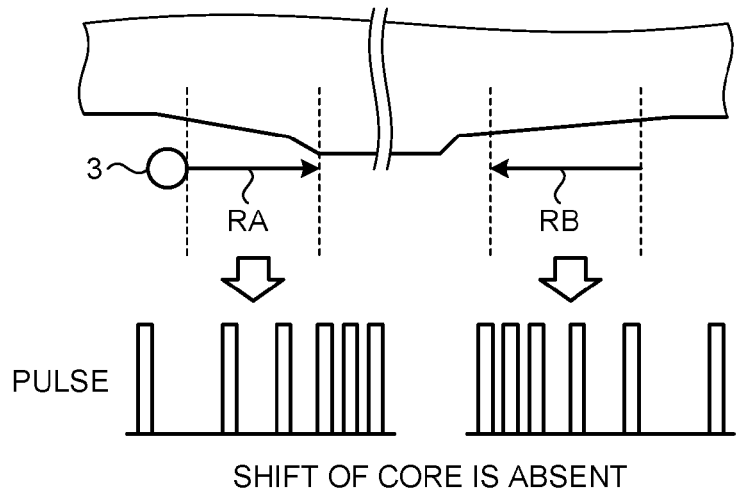
FIG. 16 is a diagram for explaining a discharge frequency at the time when a shift of the core is absent.
Figure 17:
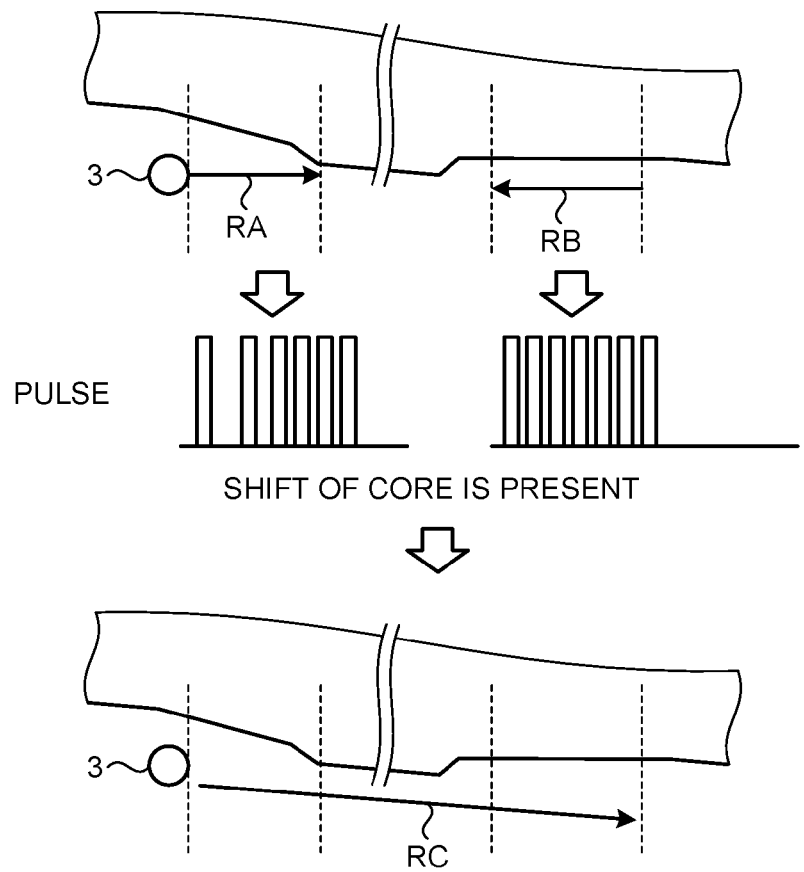
FIG. 17 is a diagram for explaining a discharge frequency at the time when a shift of the core is present.

FIG. 16 is a diagram for explaining a machining pulse at the time when a shift of the core is absent. FIG. 17 is a diagram for explaining a machining pulse at the time when a shift of the core is present. The inclination-degree calculating unit 68 counts a machining pulse at the time when the approach run section is machined and determines a tilt degree of the core 5 on the basis of a count result.

If a shift is absent in the core 5, as shown in FIG. 16, changes in a discharge frequency (transitions of the discharge frequency) (pulse timings) are the same in an approach run section RA in front of the uncut portion 7 and an approach run section RB behind the uncut portion 7.

However, when the core 5 tilts with respect to the outer frame portion 6 (a machining route of the wire 3), a difference occurs in the discharge frequencies in both the sections. In other words, if a shift is present in the core 5, as shown in FIG. 17, changes in a discharge frequency are different in the approach run section RA in front of the uncut portion 7 and the approach run section RB behind the uncut portion 7.

The tilt-degree calculating unit 68 calculates a tilt of the core 5 on the basis of such a temporal change (a difference between the discharge frequencies). When the number of pulse discharges in the approach run section RA in front of the uncut portion 7 is represented as Pa and the number of pulse discharges in the approach run section RB behind the uncut portion 7 is represented as Pb, the inclination-degree calculating unit 68 calculates the tilt of the core 5 on the basis of the following Expression (1):

$$|Pa-Pb|/\{Pa+Pb\}/2 \propto (\text{tilt}) \quad (1)$$

The machining-route setting unit 67 changes the machining route of the finish program used in the uncut portion 7. In FIG. 17, a machining route RC corresponding to inclination of the core 5 is set as a machining route to the uncut portion 7.

Note that, instead of the machining-route setting unit 67 correcting the machining route, the finishing-condition setting unit 66 can correct machining energy during Q-th and subsequent cuts of the uncut portion 7. In this case, the finishing-condition setting unit 66 sets machining energy corresponding to the tilt degree of the core 5.

When a change in a discharge frequency at the time when the approach run section is machined and a change in a discharge frequency at the time when the residual part machining is performed are different, the wire electric discharge machining apparatus 1 can perform the additional machining of the residual part machined portion under the machining conditions used for the residual part machining. In other words, when detecting a change in the discharge frequencies during the machining of the approach run section and during the residual part machining, the wire electric discharge machining apparatus 1 can perform the additional machining on the residual part machined portion and the approach run section under the machining conditions used for the residual part machining. In this case, the wire electric discharge machining apparatus 1 repeats the additional machining until a difference between the discharge frequencies during the machining in the approach run section and during the residual part machining is eliminated. In the additional machining, the wire electric discharge machining apparatus 1 increases the quiescent pulse width stepwise while keeping the pulse width fixed from the initial conditions. For example, in the additional machining, the finishing-condition setting unit 66 uses the pulse of any one of the regions A to C shown in FIG. 13.

The wire electric discharge machining apparatus 1 does not have to form the approach run section. Even in this case, the inclination-degree calculating unit 68 can calculate the tilt degree of the core 5 on the basis of a change in a discharge frequency of the uncut portion 7.

In this way, the machining route in performing the residual part machining is corrected according to the tilt degree of the core 5. Therefore, even when the core 5 tilts, it is possible to accurately form the core 5 in a desired shape.

Note that, in the processing of (2), the electric condition is corrected as the machining condition for the residual part machining. However, other machining conditions can be corrected. For example, the finishing-condition setting unit 66 can correct a shifting amount or can correct machining speed as the machining condition. Therefore, the finishing-condition setting unit 66 changes, as the machining condition, at least one of the electric condition, the shifting amount, and the machining speed. The shifting amount is a distance from the position of the wire 3 in S-th (S is a natural number) machining to the position of the wire 3 in (S+1)-th machining.

In the processing of (2), the wire electric discharge machining apparatus 1 can allow an electric current to easily flow by reducing a resistance value during the residual part machining after using the same voltage value in the C-shape machining and during the residual part machining.

Figure 18:
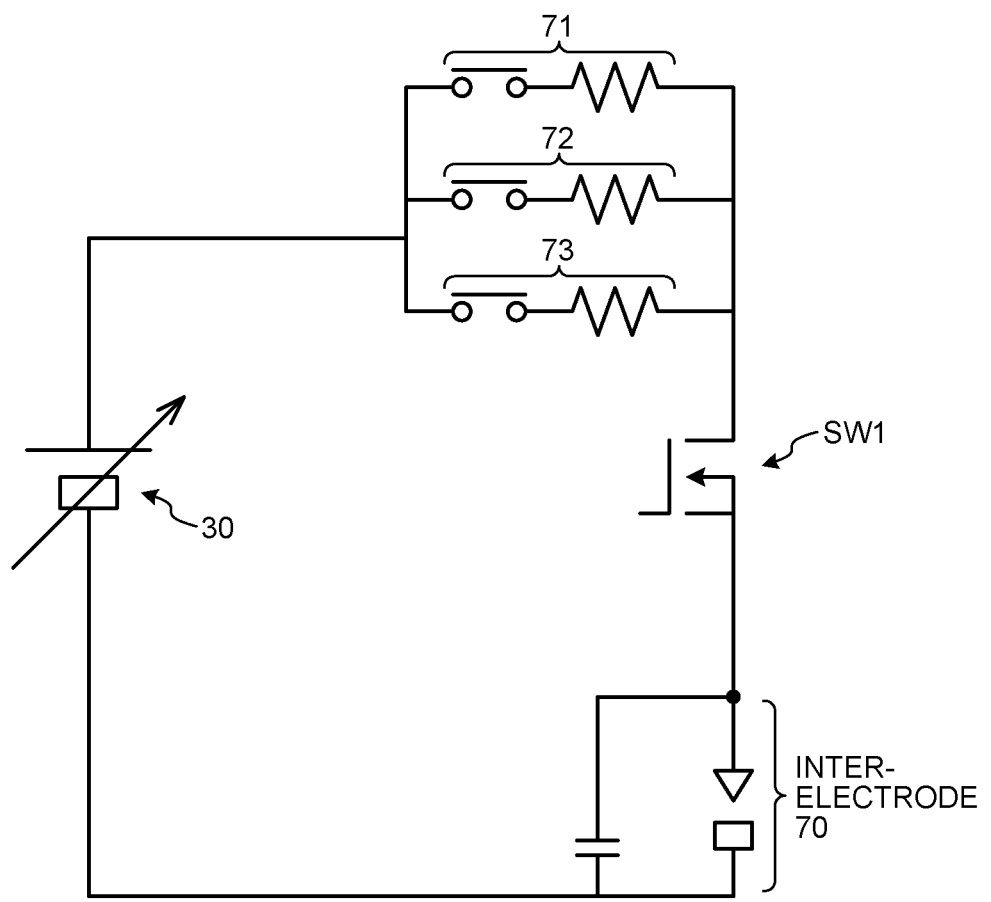
FIG. 18 is a diagram for explaining current adjustment in which adjustment of a resistance value is used.

FIG. 18 is a diagram for explaining current adjustment in which adjustment of a resistance value is used. In FIG. 18, for example, an example of a power supply for finishing used in the 3rd and subsequent machining is shown. A resistor, ON/OFF of which can be switched, is disposed between inter-electrode 70, which is present between the wire 3 and the workpiece 4, and the machining power supply 30.

In FIG. 18, resistors 71 to 73, ON/OFF of which can be switched, are disposed between the inter-electrode 70 and the machining power supply 30. The wire electric discharge machining apparatus 1 reduces a resistance value during the residual part machining to be smaller than a resistance value during the C-shape machining by switching ON/OFF of the resistors 71 to 73. The wire electric discharge machining apparatus 1 turns on/off the switching element SW1, which is configured by an FET (Field Effect Transistor) or the like, or causes the switching element SW1 to oscillate in a group pulse shape to supply electric power to the inter-electrode 70.

Note that the wire electric discharge machining apparatus 1 only has to be configured to be capable of executing at least one of (1) to (6). For example, when the processing of (2) is not executed, the discharge-current detecting unit 51, the discharge-current input unit 61, and the impedance calculating unit 65 can be excluded from the components of the wire electric discharge machining apparatus 1. When the processing of (3) is not executed, the level-difference detecting unit 52 and the level-difference-information input unit 62 can be excluded from the components of the wire electric discharge machining apparatus 1.

Figure 19:
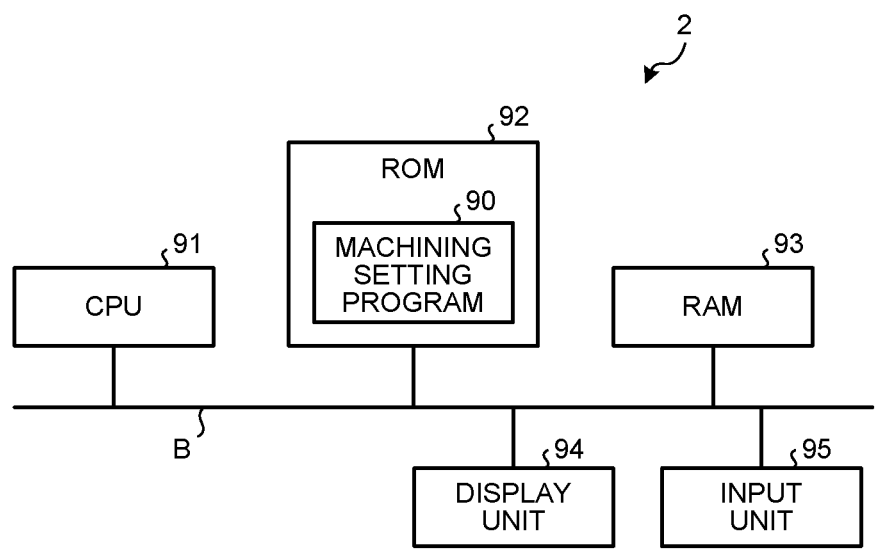
FIG. 19 is a diagram showing the hardware configuration of a control device.

FIG. 19 is a diagram showing the hardware configuration of the control device. The control device 2 includes a CPU (Central Processing Unit) 91, a ROM (Read Only Memory) 92, a RAM (Random Access Memory) 93, a display unit 94, and an input unit 95. In the control device 2, the CPU 91, the ROM 92, the RAM 93, the display unit 94, and the input unit 95 are connected via a bus line B.

The CPU 91 performs setting of finishing conditions or a machining route using a machining setting program 90, which is a computer program. The display unit 94 is a display device such as a liquid crystal monitor. The display unit 94 displays the finishing conditions, the machining route, and the like on the basis of an instruction from the CPU 91. The input unit 95 includes a mouse and a keyboard. The input unit 95 receives an input of instruction information (parameters and the like necessary for the finishing conditions or the machining route) externally input from a user. The instruction information input to the input unit 95 is sent to the CPU 91.

The machining setting program 90 is stored in the ROM 92 and loaded to the RAM 93 via the bus line B. The CPU 91 executes the machining setting program 90 loaded in the RAM 93. Specifically, in the control device 2, according to the instruction input from the input unit 95 by the user, the CPU 91 reads out the machining setting program 90 from the ROM 92, develops the machining setting program 90 in a program storage region in the RAM 93, and executes various kinds of processing. The CPU 91 temporarily stores various data generated in the various kinds of processing in a data storage region formed in the RAM 93.

The machining setting program 90 executed by the control device 2 has a module configuration including at least one of the impedance calculating unit 65, the finishing-condition setting unit 66, the machining-route setting unit 67, the inclination-degree calculating unit 68, and the instruction output unit 69. The machining setting program 90 is loaded onto a main storage device and the impedance calculating unit 65, the finishing-condition setting unit 66, the machining-route setting unit 67, the inclination-degree calculating unit 68, and the instruction output unit 69 are generated on the main storage device.

In this embodiment, according to the embodiment, electric power is fed to the wire 3 from the power feeding terminal 9B disposed in the position on the side apart from the bridging sections 21A to 21D. Therefore, it is possible to easily stabilize machining energy in the plate thickness direction of the workpiece 4.

An electric current during the residual part machining is set on the basis of an electric current during the C-shape machining. Therefore, it is possible to easily align surface roughness of the core 5 in the C-shape machining and surface roughness of the core 5 in the residual part machining.

When a level difference is detected between the C-shape machined portion and the residual part machined portion, the quiescent pulse width is increased stepwise while the pulse width is kept fixed to perform the additional machining. Therefore, it is possible to easily eliminate the level difference.

Because the uncut portion 7 is finished to be larger than the desired dimension in advance, it is possible to start the finishing of the uncut portion 7 using the approach run section region 8. Therefore, it is possible to reduce a machining error that occurs between the C-shape machined portion and the residual part machined portion. As a result, it is possible to reduce streak-like machining traces.

A finishing condition in which a pulse width is the same as and a quiescent pulse width is different from the finishing condition for the uncut portion 7 when compared with the finishing condition is used as the finishing condition for the approach run section. Therefore, it is possible to reduce a machining error that occurs between the C-shape machined portion and the residual part machined portion. As a result, it is possible to reduce streak-like machining traces.

The machining route in which inclination is provided in the approach run section with respect to the finish surface of the core 5 is used. Therefore, it is possible to easily calculate a tilt degree of the core 5. The machining route in performing the residual part machining is corrected according to the tilt degree of the core 5. Therefore, even when the core 5 tilts, it is possible to accurately form the core 5 in a desired shape.

In this way, after the C-shape machining, appropriate machining is performed on the uncut portion 7 of the core 5. Therefore, it is possible to easily form the core 5 having high quality and a desired shape from the workpiece 4.

INDUSTRIAL APPLICABILITY

As explained above, the wire electric discharge machining apparatus, the wire electric discharge machining method, and the control device according to the present invention are suitable for formation of a desired shape from a workpiece by wire electric discharge machining.

REFERENCE SIGNS LIST 1 wire electric discharge machining apparatus
2 control device
3 wire
4 workpiece
5 core
6 outer frame portion
7 uncut portion
8 approach run section region
9A, 9B power feeding terminal
10 C-shape machining route
20 residual-part machining route
21A to 21D bridging section
30 machining power supply
51 discharge-current detecting unit
52 level-difference detecting unit
53 discharge-frequency detecting unit
65 impedance calculating unit
66 finishing-condition setting unit
67 machining-route setting unit
68 inclination-degree calculating unit
RA, RB approach run section

The invention claimed is:

1. A wire electric discharge machining apparatus comprising:
 a power supply device that applies a voltage between a wire and a workpiece;
 a machining unit that machines the workpiece by relatively moving the wire and the workpiece and forms a product part, which is an inner side portion of the workpiece and a target machining shape, by cutting off an outer frame portion from the workpiece; and
 a control device that controls the power supply device and the machining unit, wherein
 the machining unit machines a first boundary region in a boundary between a member to be the outer frame portion and a member to be the product part to leave a part of the boundary as an uncut portion, thereafter, after the member to be the product part and the member to be the outer frame portion are connected by a conductive member, cuts off the product part from the outer frame portion by machining a second boundary region, which is the uncut portion, in the boundary, and, when machining the workpiece, repeats a plurality of times of machining for the first boundary region and repeats a plurality of times of machining for the second boundary region, the second boundary region includes a first region and a second region used as an approach run section when starting a machining of the first region, the second boundary region has a side crossing a machining direction in machining the first region, and a machining start point of the second boundary region is set on the crossing side, and when machining the second boundary region, the control device controls the machining unit to start the machining from the machining start point and to machine the second boundary region along a route such that an angle smaller than 45 degrees is formed at a vertex between a portion of the crossing side and a side of a core contacting the portion.

2. The wire electric discharge machining apparatus according to claim 1, wherein when viewed from a main axis direction of the wire, the product part has a shape surrounded by a first side formed by machining the first boundary region, second sides formed by machining the first and second boundary regions, and a third side formed by machining the second boundary region, and when viewed from the main axis direction of the wire, when machining the second boundary region, the control device controls the machining unit to start the machining from the machining start point and, when finishing the second boundary region, the control device controls the machining unit to perform the machining from the second sides along the third side.

3. The wire electric discharge machining apparatus according to claim 2, wherein the control device controls the machining unit to machine the second sides at a machining pulse width which is the same as a machining pulse width used in machining the third side and in a quiescent pulse time different from a quiescent pulse time used in machining the third side.

4. The wire electric discharge machining apparatus according to claim 2, wherein, when there is a difference between a discharge frequency in the second sides at a time when the second boundary region is machined and a discharge frequency at a time when the third side is machined, the controller causes the machining unit to perform additional machining until the difference is eliminated.

5. The wire electric discharge machining apparatus according to claim 4, wherein the control device causes the machining unit to perform the additional machining at a machining pulse width which is the same as a machining pulse width used in repeating the plurality of times of machining and while increasing stepwise a quiescent pulse time used in repeating the plurality of times of machining.

6. A wire electric discharge machining method comprising:

applying, by a power supply device, a voltage between a wire and a workpiece;

machining, by a machining unit, the workpiece by relatively moving the wire and the workpiece and forming a product part, which is an inner side portion of the workpiece and a target machining shape, by cutting off an outer frame portion from the workpiece; and controlling the power supply device and the machining unit, wherein the machining comprises machining a first boundary region in a boundary between a member to be the outer frame portion and a member to be the product part to leave a part of the boundary as an uncut portion, thereafter, after the member to be the product part and the member to be the outer frame portion are connected by a conductive member, cutting the product part off from the member to be the outer frame portion by machining a second boundary region, which is the uncut portion, in the boundary, and, when the workpiece is machined, repeating the machining a plurality of times for the first boundary region and a plurality of times for the second boundary region, the second boundary region includes a first region and a second region used as an approach run section when starting a machining of the first region, the second boundary region has a side crossing a machining direction in machining the first region, and a machining start point of the second boundary region is set on the crossing side, and the controlling comprises, when the second boundary region is machined, controlling the machining unit to start the machining from the machining start point and to machine the second boundary region along a route such that an angle smaller than 45 degrees is formed at a vertex between a portion of the crossing side and a side of a core contacting the portion.

7. A controller apparatus comprising:

a control device that controls a power supply device that applies a voltage between a wire and a workpiece; and a machining unit that machines the workpiece by relatively moving the wire and the workpiece and forms a product part, which is an inner side portion of the workpiece and a target machining shape, by cutting off an outer frame portion from the workpiece, wherein the control device causes the machining unit to machine a first boundary region in a boundary between a member to be the outer frame portion and a member to be the product part to leave a part of the boundary as an uncut portion, thereafter, after the member to be the product part and the member to be the outer frame portion are connected by a conductive member, cuts off the product part from the member to be the outer frame portion by causing the machining unit to machine a second boundary region, which is the uncut portion, in the boundary, and, when machining the workpiece, causes the machining unit to repeat a plurality of times of machining for the first boundary region and causes the machining unit to repeat a plurality of times of machining for the second boundary region, the second boundary region includes a first region and a second region used as an approach run section when starting a machining of the first region, and the second boundary region has a side crossing a machining direction in machining the first region, a machining start point of the second boundary region is set on the crossing side, and, when machining the second boundary region, the control device controls the machining unit to start the machining from the machining start point and to machine the second boundary region along a route such that an angle smaller than 45 degrees is formed at a vertex between a portion of the crossing side and a side of a core contacting the portion.

* * * * *